United States Patent
Yao et al.

(10) Patent No.: US 10,747,884 B2
(45) Date of Patent: Aug. 18, 2020

(54) TECHNIQUES FOR COORDINATING DEVICE BOOT SECURITY

(71) Applicant: INTEL CORPORATION, Santa Clara, CA (US)

(72) Inventors: Jiewen Yao, Shanghai (CN); Vincent J. Zimmer, Federal Way, WA (US); Wei Li, San Jose, CA (US); Rajesh Poornachandran, Portland, OR (US); Giri P. Mudusuru, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 244 days.

(21) Appl. No.: 15/778,980

(22) PCT Filed: Dec. 24, 2015

(86) PCT No.: PCT/CN2015/098651
§ 371 (c)(1),
(2) Date: May 24, 2018

(87) PCT Pub. No.: WO2017/107122
PCT Pub. Date: Jun. 29, 2017

(65) Prior Publication Data
US 2018/0341774 A1 Nov. 29, 2018

(51) Int. Cl.
*G06F 21/57* (2013.01)
*G06F 21/44* (2013.01)
(Continued)

(52) U.S. Cl.
CPC ............ *G06F 21/575* (2013.01); *G06F 21/44* (2013.01); *G06F 21/53* (2013.01); *G06F 21/57* (2013.01);
(Continued)

(58) Field of Classification Search
CPC ....... G06F 9/4406; G06F 21/53; G06F 21/575
See application file for complete search history.

(56) References Cited

U.S. PATENT DOCUMENTS

2004/0073806 A1    4/2004  Zimmer
2005/0071616 A1*   3/2005  Zimmer ............... G06F 9/4401
                                                         713/1
(Continued)

FOREIGN PATENT DOCUMENTS

EP       2141625 B1     10/2015
WO    2015165000 A1     11/2015

OTHER PUBLICATIONS

International Search Report received for PCT Patent Application No. PCT/CN2015/098651, dated Sep. 28, 2016, 4 pgs.

*Primary Examiner* — Albert Wang

(57) ABSTRACT

Techniques for providing and maintaining protection of firmware routines that form part of a chain of trust through successive processing environments. An apparatus may include a first processor component (550); a volatile storage (562) coupled to the first processor component; an enclave component to, in a pre-OS operating environment, generate a secure enclave within a portion of the volatile storage to restrict access to a secured firmware loaded into the secure enclave; a first firmware driver (646) to, in the pre-OS operating environment, provide a first API to enable unsecured firmware to call a support routine of the secured firmware from outside the secure enclave; and a second firmware driver (647) to, in an OS operating environment that replaces the pre-OS operating environment, provide a second API to enable an OS of the OS operating environment to call the support routine from outside the secure enclave.

25 Claims, 16 Drawing Sheets

(51) Int. Cl.
  *G06F 21/53* (2013.01)
  *G06F 9/4401* (2018.01)
  *G06F 9/54* (2006.01)

(52) U.S. Cl.
  CPC .......... *G06F 21/572* (2013.01); *G06F 9/4406* (2013.01); *G06F 9/547* (2013.01)

(56) References Cited

U.S. PATENT DOCUMENTS

| | | | |
|---|---|---|---|
| 2009/0025067 A1* | 1/2009 | Holt | G06F 21/575 726/5 |
| 2011/0131447 A1 | 6/2011 | Prakash et al. | |
| 2014/0047428 A1 | 2/2014 | Prakash et al. | |

\* cited by examiner

TECHNIQUES FOR COORDINATING DEVICE BOOT SECURITY

RELATED CASE

This application is a national phase claiming the benefit of and priority to International Patent Application No. PCT/CN2015/098651, filed Dec. 24, 2015, entitled "TECHNIQUES FOR COORDINATING DEVICE BOOT SECURITY", which are hereby incorporated by reference in its entirety.

BACKGROUND

Support routines used to initialize a processing device, boot an operating system on the processing device and provide ongoing support services for the operating system may become a target for interference and/or corruption by malicious software (e.g., such malware as viruses, worms, etc.). Such support routines may be relied upon to configure aspects of the processing device in preparation for booting and/or running the operating system. Alternatively or additionally, such support routine may be relied upon to provide various security functions, such as encryption for network communications and/or access to secured storage devices.

Various forms of malware may attempt to interfere with and/or corrupt such support routines during such initialization and/or configuration of the processing device so as to be in place to take over the processing device prior to booting the operating system. The intention may be to try to become embedded at a point within a chain of trust that is early enough to defeat various security measures that may be put in place at the time the operating system is booted and/or while the operating system is executed.

DETAILED DESCRIPTION

Figure 1A:
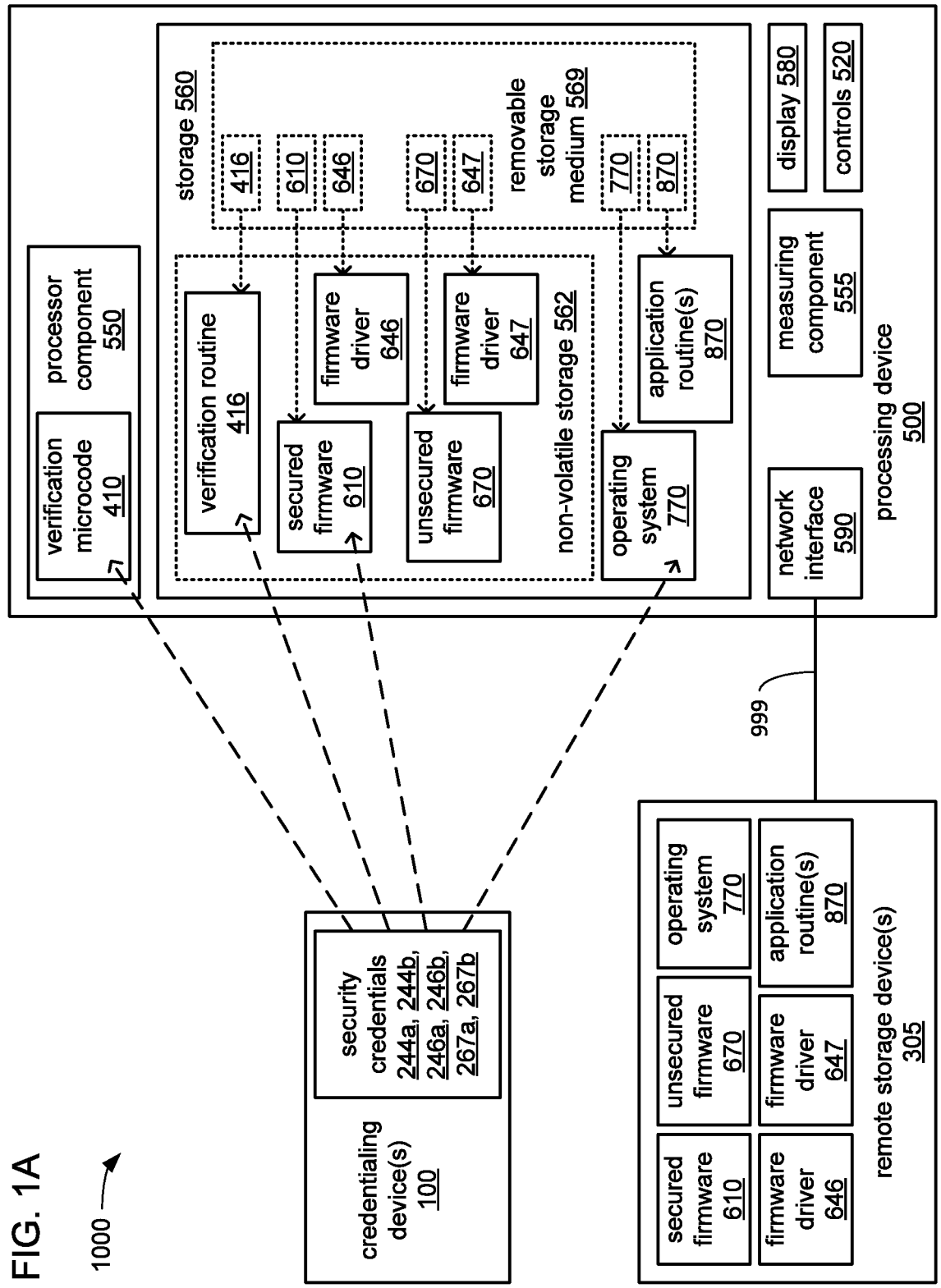
FIGS. 1A and 1B each illustrate an example embodiment of a secure processing system.

Various embodiments are generally directed to techniques for providing and maintaining protection of firmware routines that form part of a chain of trust through successive processing environments. At least during initialization of a processing device, verification microcode incorporated into a processor component thereof may serve as an initial portion of a chain of trust. The verification microcode and/or a verification routine that is verified by the verification microcode may attempt to authenticate a firmware as trustworthy. Upon successful authentication of the firmware, thereby extending the chain of trust to the firmware, the processor component may execute the firmware in a pre-operating system (pre-OS) processing environment to perform various initialization and configuration tasks to prepare the processing device for operation in a subsequent OS processing environment. In so doing, the processor component may generate a secure enclave within a portion of a storage of the processing device (e.g., a portion of random access memory (RAM) of the processing device) in which a secured portion of the firmware is protected from access by other routines executed within the pre-OS processing environment that are external to the secure enclave. Such other routines may make calls to secured portion of the firmware within the secure enclave through a first firmware driver. Following the performance of such initialization and configuration tasks within the pre-OS operating environment, the firmware may attempt to authenticate an OS as trustworthy. Upon successful authentication of the OS, thereby extending the chain of trust to the OS, the processor component may load portions of the OS in preparation for booting the OS. In so doing, the processor component may prepare for the secure enclave to remain in place through the transition from the end of pre-OS operating environment and to the beginning of the OS operating environment that is to occur as a result of booting the OS. In so doing, the processor component may load a second firmware driver to enable the OS and/or application routines executed in the OS environment to make calls to the secured portion of the firmware within the secure enclave.

In some of these embodiments, one or more components of the processing device may be selected to conform to aspects of the IA-32 architecture promulgated by Intel® Corporation of Santa Clara, Calif. and/or to aspects of the Unified Extensible Firmware Interface promulgated by the UEFI Forum of Beaverton, Oreg. In such embodiments, the processor component may be one of the Intel Corporation Pentium®, Itanium® or Core series processor components, the verification microcode may be incorporated into the processor component during fabrication by Intel Corporation, the verification routine may be an Authenticated Code Module (ACM) provided by Intel Corporation, the firmware may be a Basic Input/Output System (BIOS) provided by any of a variety of sources, and the OS may be a version of Windows™ from Microsoft® Corporation of Redmond, Wash., or a version of Linux® provided by any of a variety of sources.

More specifically, during manufacture of a processor component to be incorporated into a processing device, verification microcode and at least one security credential associated with the verification microcode may be incorporated into the processor component. Again, the verification microcode may serve as an initial portion of a chain of trust that may be intended to extend among at least the processor component, the firmware and the OS as part of providing a secure processing environment in which to execute an application routine. To build that chain of trust, the verification microcode may cause the processor component, upon initialization within the processing device, to retrieve a verification routine that may be stored within the processing device and to use the at least one security credential associated with the verification microcode to attempt to authenticate the verification routine as trustworthy. Upon being authenticated, the verification routine may cause the processor component to retrieve a firmware that may also be stored within the processing device and to use at least one security credential associated with the verification routine to attempt to authenticate the firmware as trustworthy. Alternatively, the verification microcode may cause the processor component to attempt to directly authenticate the firmware as trustworthy using the at least one security credential associated with the verification microcode.

The initialization of the processing device may be triggered by such events as powering up of the processing device, a software-triggered and/or hardware-triggered reset, etc. In some embodiments, the at least one security credential associated with the verification microcode and/or with the verification routine may be an encryption key that is meant to be used to authenticate a digital signature (or of a hash thereof). Still other types of security credentials and/or other mechanisms to attempt to authenticate the verification routine and/or the firmware may be used in other embodiments. In some embodiments, if the firmware is unable to be authenticated, then the processor component may cease to take any further action to initialize the processing device and/or may take action to render the processing device inoperable as part of securing the processing device.

However, if the firmware is able to be authenticated, the processor component may commence executing the firmware, thereby extending the chain of trust to include the firmware and creating a pre-OS processing environment in which the processor component is caused by the firmware to perform various initialization and configuration tasks to prepare the processing device for operation in a subsequent OS processing environment. Again, as part of performing such tasks, the processor component may generate a secure enclave within a portion of a storage of the processing device into which a secured portion of the firmware may be loaded so as to be protected from access by other routines executed within the pre-OS processing environment that are external to the secure enclave. Such a secured portion of the firmware may include various support routines that perform various security functions, such encrypting/decrypting data, and authenticating various hardware and/or software components of the processing device and/or of other devices that may be coupled to and/or otherwise communicate with the processing device. Alternatively or additionally, such a secured portion of the firmware may include various authenticated variables employed in performing various security functions (e.g., encryption/decryption keys, access passwords, etc.) and/or various functions that are deemed to require being performed in a secured environment.

In embodiments in which the secured portion includes support routines that are to be maintained within the secure enclave, the processor component may be caused by the firmware to execute various routines maintained externally of the secure enclave to perform various ones of the initialization and configuration tasks, but which may rely on the support routines within secure enclave. To enable calls made by routines external to the secure enclave to reach the support routines within the secure enclave, the processor component may be caused by the firmware to employ a firmware driver loaded externally of the secure enclave that is able to receive those calls and relay them to the support routines within the secure enclave. The firmware driver may provide an application programming interface (API) to which those calls may be made by the various routines maintained externally of the secure enclave.

Upon formation of the secure enclave and the loading of the secured portion of the firmware into the secure enclave, a measure may be taken of the secure enclave (e.g., a hash thereof). In some embodiments, the taking of the measure may be a function of the processor component and/or a storage controller of the processing device. Such a measure may be preserved for use in a subsequent comparison to another measure taken of the secure enclave to ensure that the secured portion of the firmware stored therein has not been compromised. It may be that one or more of the routines of the firmware that are external to the secure enclave may use the stored measure to check the integrity of the secured portion of the firmware stored within the secure enclave while the pre-OS operating environment is in place.

Following the performance of such initialization and configuration tasks within the pre-OS operating environment, the secured portion of the firmware may attempt to authenticate an OS as trustworthy. Upon successful authentication of the OS, thereby extending the chain of trust to the OS, the processor component may load portions of the OS in preparation for booting the OS. Support routines and/or authenticated variables that may be included in the secured portion of the firmware previously loaded into the secure enclave may be utilized by the OS and/or by one or more application routines executed within the OS operating environment to be generated upon booting of the OS. Thus, it may be deemed desirable for the secured portion of the firmware to remain protected in the OS operating environment just as it is protected in the pre-OS operating environment such that the secure enclave may be maintained even after the pre-OS operating environment is supplanted by the OS operating environment.

In embodiments in which the secured portion includes support routines that are to be maintained within the secure enclave and that are to be called by OS routines, which may be maintained externally of the secure enclave, the processor component may be caused by the firmware to load another firmware driver externally of the secure enclave that is able to receive calls made by such OS routines and relay them to the support routines within the secure enclave. In a manner corresponding to the initial firmware driver to receive calls made by firmware routines external to the secure enclave, the other firmware driver may provide an application programming interface (API) to which the calls made by OS routines may be directed.

Following the loading of at least portions of the OS and the loading of the other firmware driver, the processor component may cease execution of the firmware routines that are external to the secure enclave and may commence execution of a one of the portions of the OS that has been loaded by the firmware, thereby booting the OS. In this way, the transition from the pre-OS operating environment and the OS operating environment may be made. As part of the booting of the OS, the processor component may be caused to load and/or commence execution of more portions of the OS. Alternatively or additionally, the processor component may be caused to load and/or commence execution of one or more application routines.

During booting of the OS to generate the OS operating environment and/or following booting of the OS such that the OS operating environment is in place, the processor component may be caused by the OS to use the earlier generated and stored measure of the secure enclave to check the integrity of the secured portion of the firmware stored therein. Alternatively or additionally, one or more application routines executed by the processor component within the OS operating environment may do so. Also during and/or following booting of the OS, the OS and/or one or more application routines may make calls to the API generated by the other firmware driver to make use of one or more support routines and/or authenticated variables that may be included in the secured portion of the firmware stored within the secure enclave.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an embodiment of a secure processing system 1000 incorporating one or more credentialing devices 100, one or more remote storage devices 305 and/or a processing device 500. In the secure processing system 1000, one or more matched sets of security credentials may be provided by the one or more credentialing devices 100 for use by one or more pairs of components of the processing device 500 to enable one or more portions of a chain of trust to be formed thereamong during initialization of the processing device 500. One or more executable routines of those components may be provided to the processing device 500 by one or more remote storage devices 305.

As depicted, at least the one or more remote storage devices 305 and the processing device 500 may exchange such executable routines through a network 999. Also, one or more of these exchanged executable routines may be so exchanged in encrypted form to prevent reading and/or modification thereof. However, one or more of these devices may exchange other data entirely unrelated to initializing the processing device 500 with each other and/or with still other devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the processing device 500 may incorporate a processor component 550, a storage 560, a measuring component 555, manually-operable controls 520, a display 580 and/or a network interfaces 590 to couple the processing device 500 to the network 999. The processor component 550 may incorporate microcode to control various aspects of its operation, including verification microcode 410. Although the measuring component 555 is not depicted as incorporated into any other component of the processing device 500, in some embodiments, the measuring component 555 may be incorporated into the processor component 550 or into a support component (not shown) that may provide various forms of hardware-implemented support logic to the processor component 550 (e.g., a bus interface to one or more other components of the processing device 500).

The storage 560 may store a verification routine 416, secured firmware 610, firmware drivers 646 and 647, unsecured firmware 670, an operating system (OS) 770, and one or more application routines 870. As depicted, the storage 560 may include a removable storage medium 569 (e.g., an optical disc, solid-state memory device and/or hard drive that is removable from a casing of the processing device 500, etc.) from which one or more of these executable routines may be copied into another portion of the storage 560 that may not be based on a removable storage medium (e.g., solid-state memory and/or a hard drive incorporated into a casing of the processing device 500). Alternatively or additionally, one or more of these executable routines may be retrieved from the one or more remote storage devices 305 via the network 999 and the network interface 590. As also depicted, the verification routine 416, the secured firmware 610, the drivers 646 and 647 and/or the unsecured firmware 670 may be stored in a non-volatile storage 562 based on a storage technology that allows the contents thereof to be overwritten, but retains those contents during times when electric power is not applied (e.g., one or more FLASH storage devices).

The verification microcode 410, the verification routine 416, the secured firmware 610, the firmware drivers 646 and 647, the unsecured firmware 670, the OS 770, and/or the one or more application routines 870 may each incorporate a sequence of instructions operative on the processor component 550 to implement logic to perform various functions. As will be explained in greater detail, the processor component 550 may be caused by its execution of at least the verification microcode 410 to attempt to form a chain of trust among the processor component 550 and at least the verification microcode 410 and/or the verification routine 416 using security credentials that may be provided by the one or more credentialing devices 100. More specifically, execution of the verification microcode 410 may cause the processor component 550 to attempt to authenticate the verification routine 416, and presuming such authentication is successful, execution of the verification routine 416 may cause the processor component 550 to attempt to authenticate at least the secured firmware 610. If authentication of the secured firmware 610 is successful, execution of the secured firmware 610 may cause the processor component 550 to store the secured firmware 610 within a secure enclave (not shown) defined within the storage 560 to protect the secured firmware 610. Further, if authentication of the secured firmware 610 is also successful, execution of the secured firmware 610 may cause the processor component 550 to attempt to authenticate the OS 770.

Figure 1B:
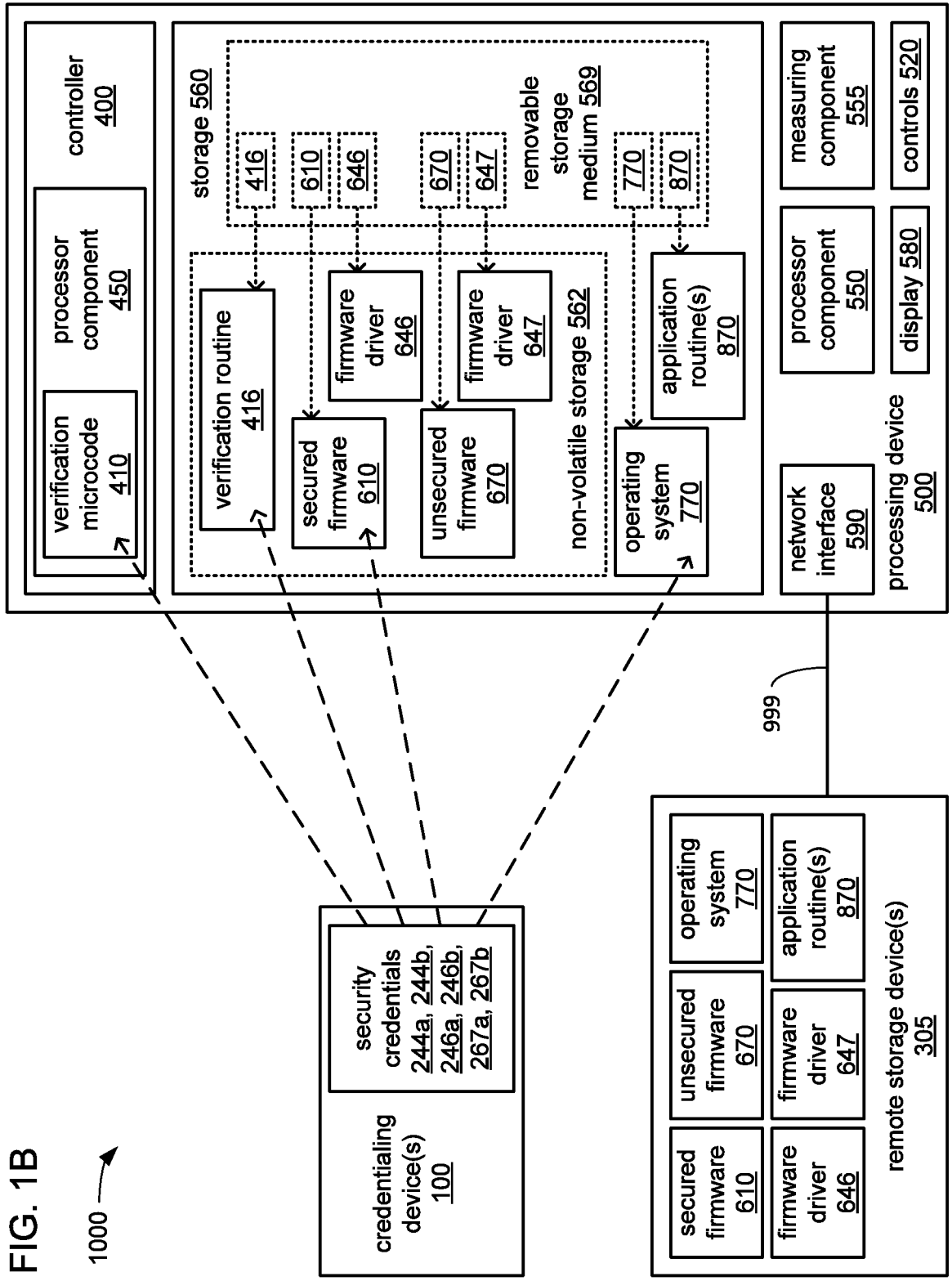

FIG. 1B illustrates a block diagram of an alternate embodiment of the secure processing system 1000 incorporating an alternate embodiment of the processing device 500. As depicted, the alternate embodiment of the processing device 500 may incorporate an additional processor component 450. The processor component 450 may operate as a controller processor in a controller processing environment that is separated from the main processing environment in which the processor component 550 may operate as the main processor component of the processing device 500. Such separation may be such as to render the controller processing environment of the processor component 450 inaccessible to malicious software (e.g., "malware") that may infiltrate the main processing environment of the processor component 550. This may enable the processor component 450 to perform various security-related functions with at least some degree of assurance that those functions cannot be interfered with by malicious software present within the main processing environment.

As depicted, the processor component 450 may incorporate the verification microcode 410 in lieu of the processor component 550 doing so. Thus, in the depicted alternate embodiment of the processing device 500 of FIG. 1B, it may be the processor component 450 that executes the verification microcode 410, instead of the processor component 550. In this way, it may be the processor component 450 that attempts to authenticate the verification routine 416 as trustworthy from within the more secure controller processing environment to form the initial portion of a chain of trust among the processor component 550, the verification microcode 410 and the verification routine 416.

Figure 2:
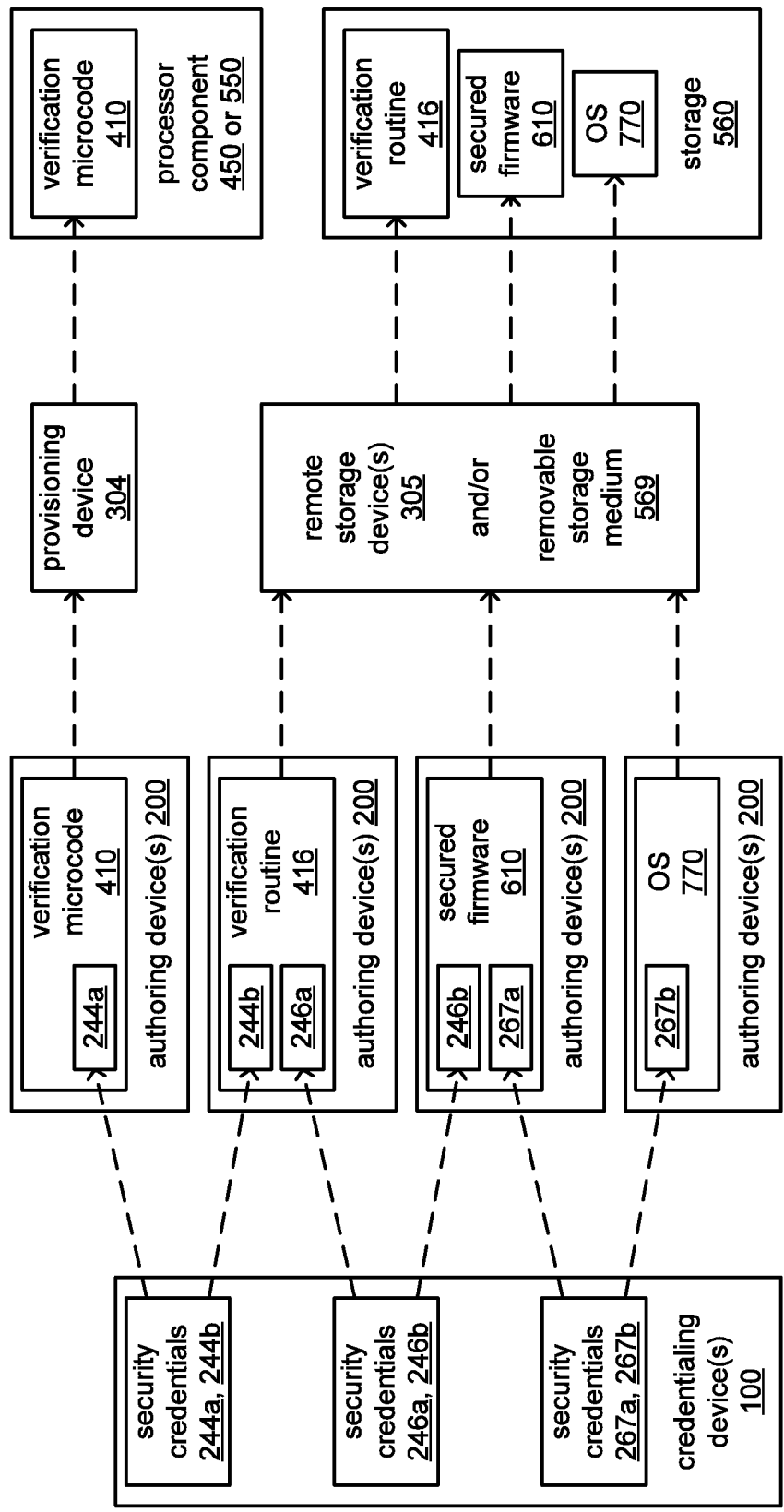
FIG. 2 illustrates an example embodiment of a providing security credentials to components of a processing device.

FIG. 2 depicts aspects of the provisioning of matching security credentials to enable attempts at forming and extending a chain of trust among components of the processing device 500. As depicted, each of the verification microcode 410, the verification routine 416, the secured firmware 610 and the OS 770 may be generated using different authoring devices 200. Each of the authoring devices 200 may be a server or other form of computing device executing a compiler and/or other tools for generating executable routines to generate a corresponding one of these executable routines 410, 416, 610 and/or 770.

As familiar to those skilled in the art of developing components of a processing device, various hardware and software components of the processing device 500 may be provided for inclusion within the processing device 500 by different entities (e.g., different corporate, educational and/or governmental entities) with little or no coordination therebetween, including such components as each of the processor components 450 and/or 550, and/or each of the executable routines 410, 416, 610 and/or 770. As a result, different entities may possess and operate different ones of the depicted authoring devices 200 to separately develop and generate different ones of the executable routines 410, 416, 610 and/or 770. Again, by way of example, the processor component 450 or 550 may be provided by Intel Corporation of Santa Clara, Calif., along with the verification microcode 410 and/or the verification routine 416, while the secured firmware 610 may be provided by any of a variety of entities, and the OS 770 may be provided by Microsoft Corporation of Redmond, Wash., or any of a variety of entities that provide a version of Linux.

However, as also familiar to those skilled in the art, while the mere assembly of components from different source entities to form a processing device may be performed with little or no coordination thereamong, providing the ability for one component sourced by one such source entity to authenticate another component sourced by another such source entity often does require at least some degree of coordination among those entities to at least the extent of agreeing upon a source of the security credentials used in such authentication, such as encryption keys, seed values, etc. As a result, and as depicted, matching sets of security credentials may be provided to different ones of the authoring devices 200 associated with generating different ones of the executable routines 410, 416, 610 and/or 770 to enable such authentication thereamong.

More specifically, and by way of example, to enable the verification microcode 410 to authenticate the verification routine 416, matching security credentials 244a and 244b may be provided to the different authoring devices 200 associated with generating each of these two executable routines 410 and 416. In some embodiments, the security credentials 244a provided to the authoring device(s) 200 employed in generating the verification microcode 410 may include an encryption key to be embedded within the verification microcode 410 (or to be otherwise included alongside the verification microcode 410). Correspondingly, the security credentials 244b provided to the authoring device 200(s) employed in generating the verification routine 416 may include a matching encryption key by which the verification routine 416 (or a hash thereof) may be digitally signed as the verification routine 416 is generated to enable the verification routine 416 to be authenticated by the verification microcode 410 using the encryption key of the security credentials 244a. Again, and as will be discussed in greater detail, a successful authentication of the verification routine 416 by the verification microcode 410 may enable the beginning of the formation of the chain of trust among the processor component 550, the verification microcode 410 and the verification routine 416.

Correspondingly, and by way of another example, to enable the verification routine 416 to authenticate the secured firmware 610, matching security credentials 246a and 246b may be provided to the different authoring devices 200 associated with generating each of these two executable routines 416 and 610. In some embodiments, the security credentials 246a provided to the authoring device(s) 200 employed in generating the verification routine 416 may include an encryption key to be embedded within the verification routine 416 (or to be otherwise included alongside the verification routine 416). Correspondingly, the security credentials 246b provided to the authoring device 200(s) employed in generating the secured firmware 610 may include a matching encryption key by which the secured firmware 610 (or a hash thereof) may be digitally signed as the secured firmware 610 is generated to enable the secured firmware 610 to be authenticated by the verification routine 416 using the encryption key of the security credentials 246a. As will be discussed in greater detail, a successful authentication of the secured firmware 610 by the verification routine 416 may enable the extension of the chain of trust already in place among the processor component 550, the verification microcode 410 and the verification routine 416 to then include the secured firmware 610.

As further depicted, similarly matching security credentials 267a and 267b may be provided to the authoring devices 200 associated with generating the secured firmware 610 and the OS 770 to enable the secured firmware 610 to authenticate the OS 770. It should be noted that each of the matching sets of security credentials 244a and 244b, 246a and 246b, and 267a and 267b either may be provided by different credentialing devices 100 that are possessed and operated by different entities, or that may be possessed and operated by a single entity agreed upon by all of the entities that provide the different executable routines 410, 416, 610 and 770. Alternatively, it may be that a single credentialing device 100 possessed and operated by a single entity generates and provides all of these security credentials. It should also be noted that, although the above examples specifically discuss the use of matching keys as security credentials, any of a variety of other types of security credentials (e.g., hashes, hash values, certificates, seeds for random number generation, etc.) meant for use with any of a variety of types of authentication techniques may be employed in various embodiments.

As also further depicted, copies of the verification microcode 410 along with the security credentials 244a may be provided to the processor component 450 or 550 through a provisioning device 304. The provisioning device 304 may be incorporated into the operation of a manufacturing facility in which the processor component 450 and/or 550 is fabricated. More specifically, a copy of the verification microcode 410 along with the security credentials 244a may be incorporated into the processor component 450 or 550 before the processor component 450 or 550 is incorporated into the processing device 500. By way of example, the provisioning device 304 may be electrically coupled to one or more pins carried on a package casing in which the semiconductor die of the processor component 450 or 550 is contained to provide the verification microcode 410 along with the security credentials 244a thereto before attachment of the processor component 450 or 550 to a circuitboard of the processing device 500.

Returning to FIGS. 1A and 1B, the processor component 450 or 550 may be initialized as a result of a powering on of the processing device 500 (e.g., as a result of the commencement of provision of electric power to the processing device 500) and/or as a result of a resetting of the processing device 500 triggered either by hardware-based logic or by software. In response to such initialization, the processor component 450 or 550 may execute the verification microcode 410 in a pre-OS operating environment to begin forming a chain of trust that extends to at least the secured firmware 610 from at least the verification microcode 410 and the processor component 550.

Figure 3A:
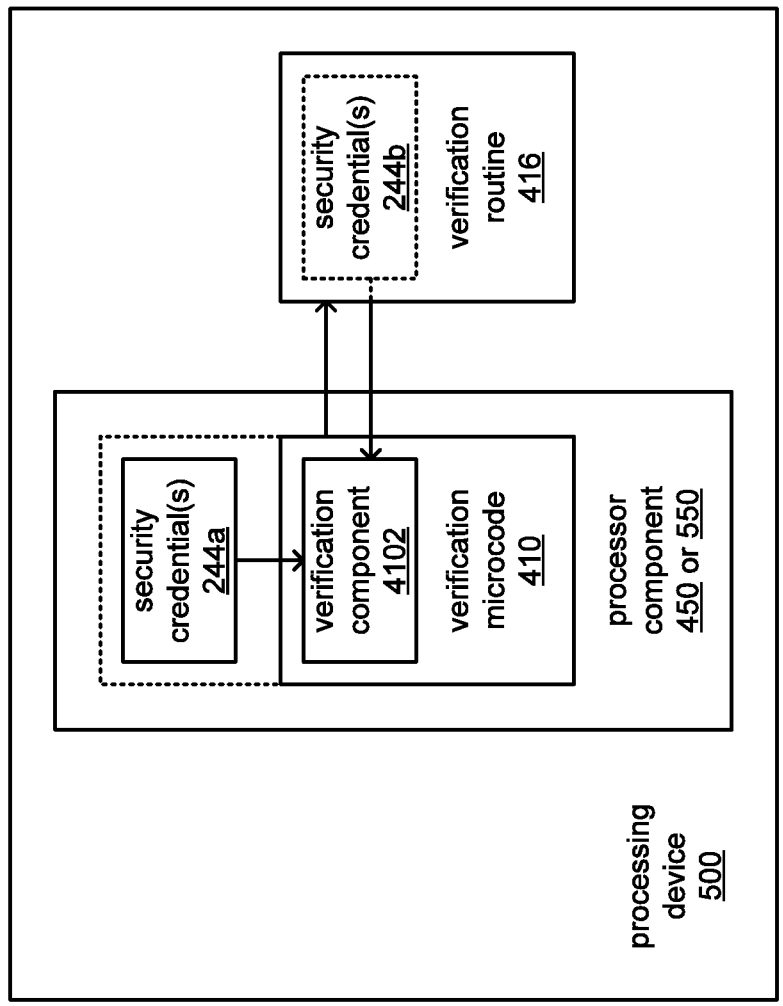
FIGS. 3A and 3B, together, illustrate an example embodiment of extending a chain of trust to include firmware.
Figure 3B:
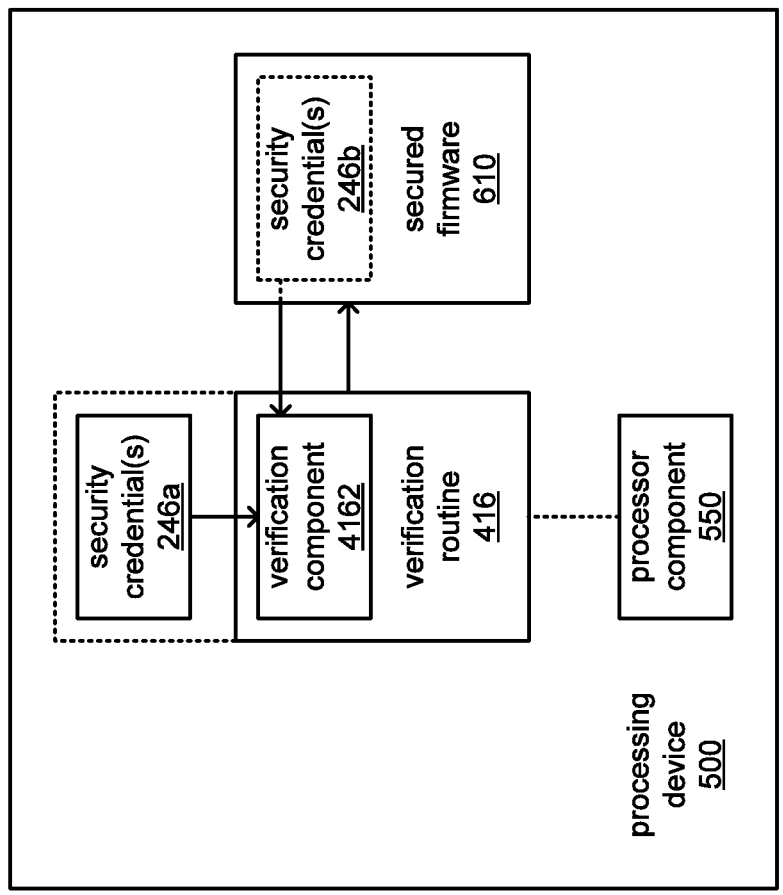

FIGS. 3A and 3B, together, depict aspects of such execution of the verification microcode 410 by either of the processor components 450 or 550 to authenticate the secured firmware 610 in a manner that includes authenticating the verification routine 416. More specifically, FIG. 3A illustrates aspects of the authentication of the verification routine 416, and FIG. 3B illustrates aspects of the authentication of the secured firmware 610. As depicted in FIG. 3A, the verification microcode 410 may include a verification component 4102. Thus, execution of the verification microcode 410 by the processor component 450 or 550 may entail execution of the verification component 4102 thereof.

In some embodiments, an address at which the verification routine 416 may be accessed within the storage 560 may be embedded (e.g., hard-coded) within the verification microcode 410 such that the processor component 450 or 550 is caused (at least by default) to at least attempt to access the verification routine 416 at that address. In such embodiments, the processor component 450 or 550 may execute instructions of the verification component 4102 to access at least a portion of the verification routine 416 where the security credentials 244b may be found, or where a signature, hash or other security credential derived from the security credentials 244b may be found. The verification component 4102 may then attempt to authenticate that retrieved security credential using the security credentials 244a that either accompany the verification microcode 410 or are embedded directly therein.

In other embodiments, a trail of one or more pointers leading to the verification routine 416 may need to be accessed within the storage 560 and then followed to determine an address at which the verification routine 416 is stored within the storage 560. In such other embodiments, the verification component 4102 of the verification microcode 410 may follow that trail until the verification routine 416 is located. Upon locating the verification routine 416, the verification component 4102 may then access the security credentials 244b or whatever security credentials may have been derived from the security credentials 244b, and then proceed with attempting to authenticate the verification routine 416. Such a trail of one or more pointers may be disposed at addresses and/or organized into a data structure that conforms to aspects of the IA-32 architecture promulgated by Intel Corporation of Santa Clara, Calif. and/or to aspects of the Unified Extensible Firmware Interface (UEFI) specification promulgated by the UEFI Forum of Beaverton, Oreg. In such embodiments, portions of the storage 560 may be mapped to particular specified addresses within four gigabyte range of addresses, and the trail of one or more pointers may begin with a pointer disposed at an address near the top of that four gigabyte address range.

Presuming that the verification routine 416 is successfully authenticated, and regardless of which of the processor components executed the verification microcode 410, the processor component 550 may then execute the verification routine 416. As depicted in FIG. 3B, the verification routine 416 may include a verification component 4162. Thus, execution of the verification routine 416 by the processor component 550 may entail execution of the verification component 4162 thereof. Where a relatively high security level has been selected, the processor component 550 may execute instructions of the verification component 4162 to access at least a portion of the secured firmware 610 where the security credentials 246b may be found, or where a signature, hash or other security credential derived from the security credentials 246b may be found. The verification component 4162 may then attempt to authenticate the secured firmware 610 by attempting to authenticate that retrieved security credential using the security credentials 246a that either accompany the verification routine 416 or are embedded directly therein.

If the secured firmware 610 cannot be authenticated by the verification component 4162, then in some embodiments, the processor component 550 may be caused to refrain from performing any further operations to initialize the processing device 500 and/or may take action to render the processing device 500 inoperable and/or to render data stored within the processing device 500 inaccessible (e.g., boot in a limited function "safe mode"). Alternatively or additionally, the processor component 550 may be caused to operate the controls 520 and/or the display 580 to present an indication of an error condition to an operator of the processing device. However, if the verification component 4162 is able to authenticate the secured firmware 610, then the processor component 550 may continue the initialization of the processing device 500.

Returning to FIGS. 1A and 1B, with the secured firmware 610 successfully authenticated, the chain of trust now includes the verification microcode 410, the verification routine 416, the processor component 550, and the secured firmware 610. The processor component 550 may commence execution of at least the secured firmware 610 in the pre-OS environment. In so doing, a secure enclave may be defined within a portion of the storage 560 into which the secured firmware 610 may be stored.

Figure 4A:
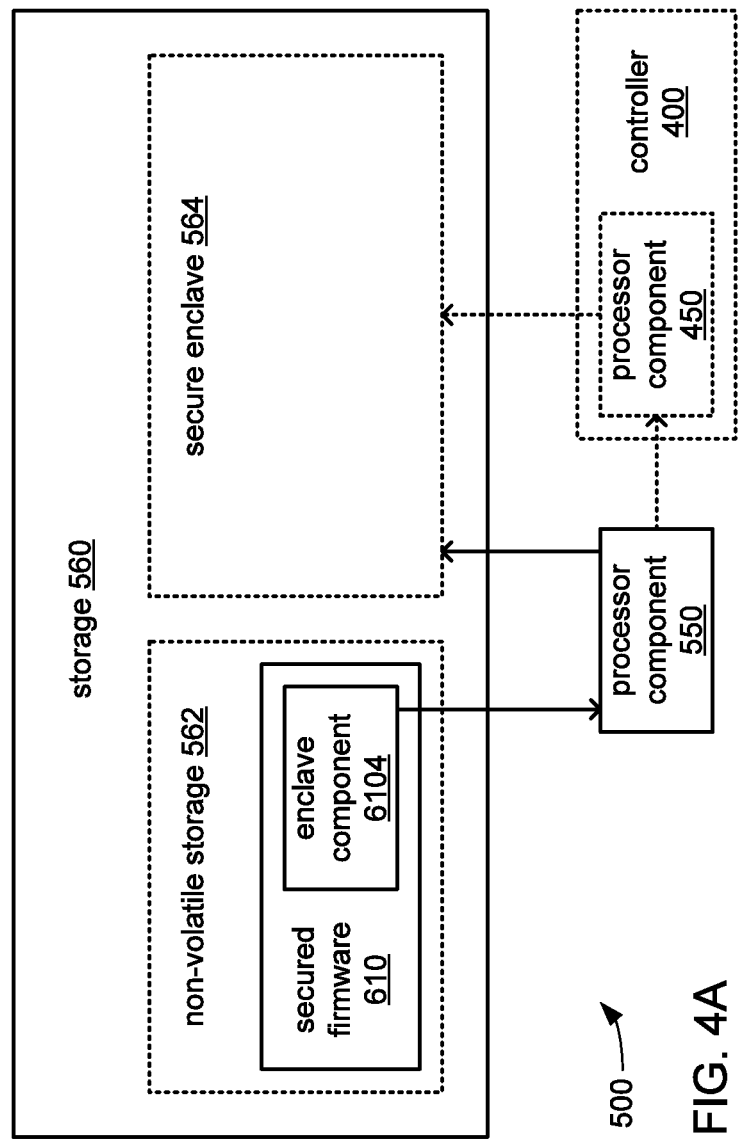
FIGS. 4A, 4B, 4C and 4D, together, illustrate an example embodiment of preparing a processing device to support execution of an operating system.
Figure 4B:
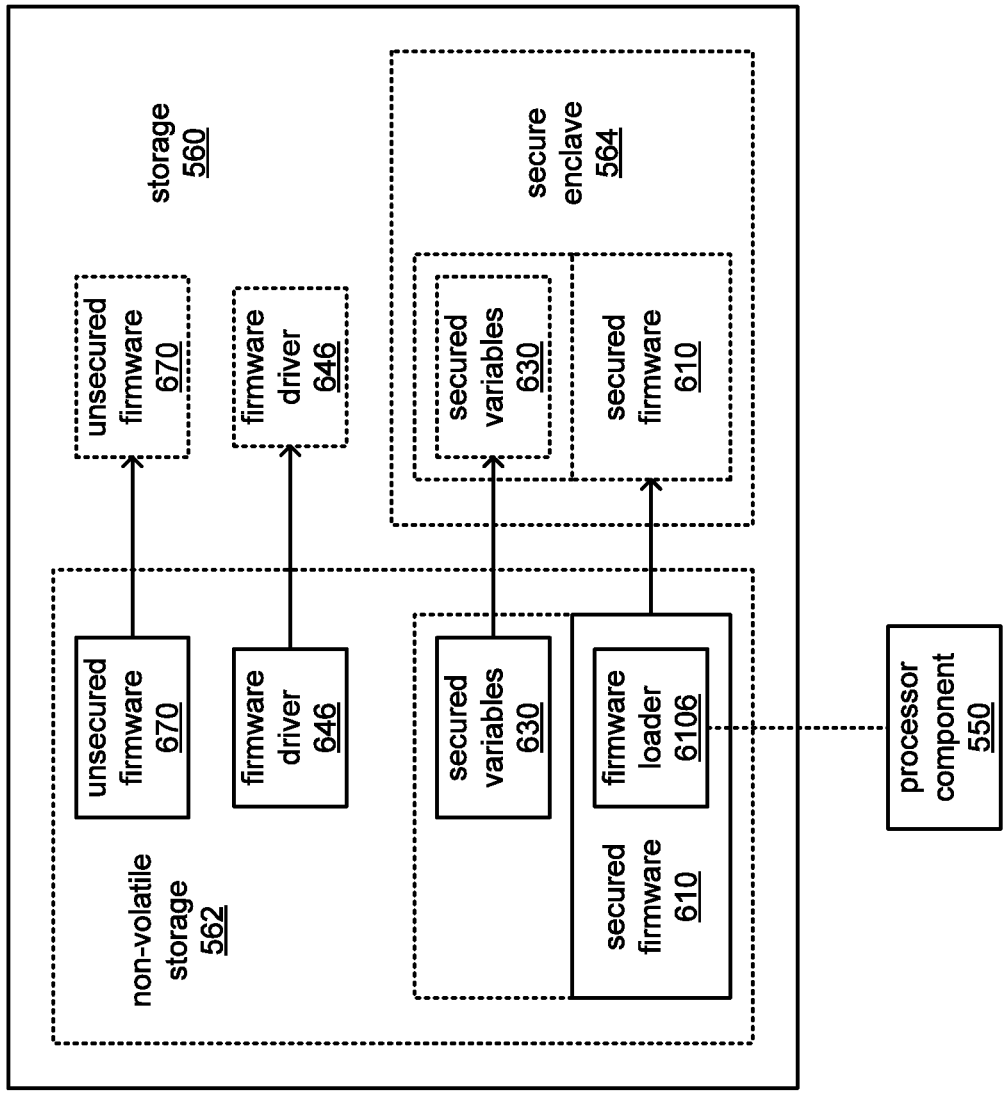
Figure 4C:
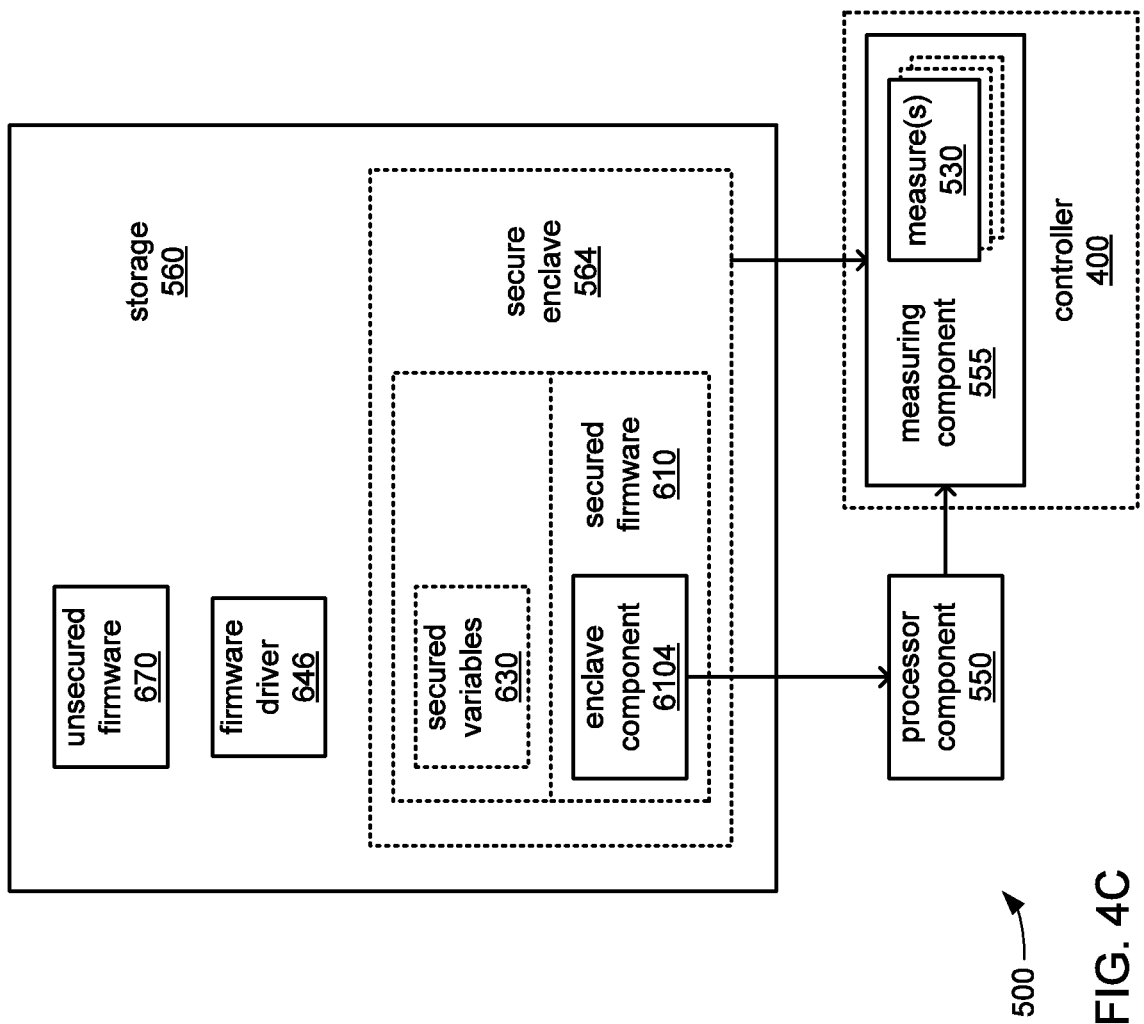
Figure 4D:
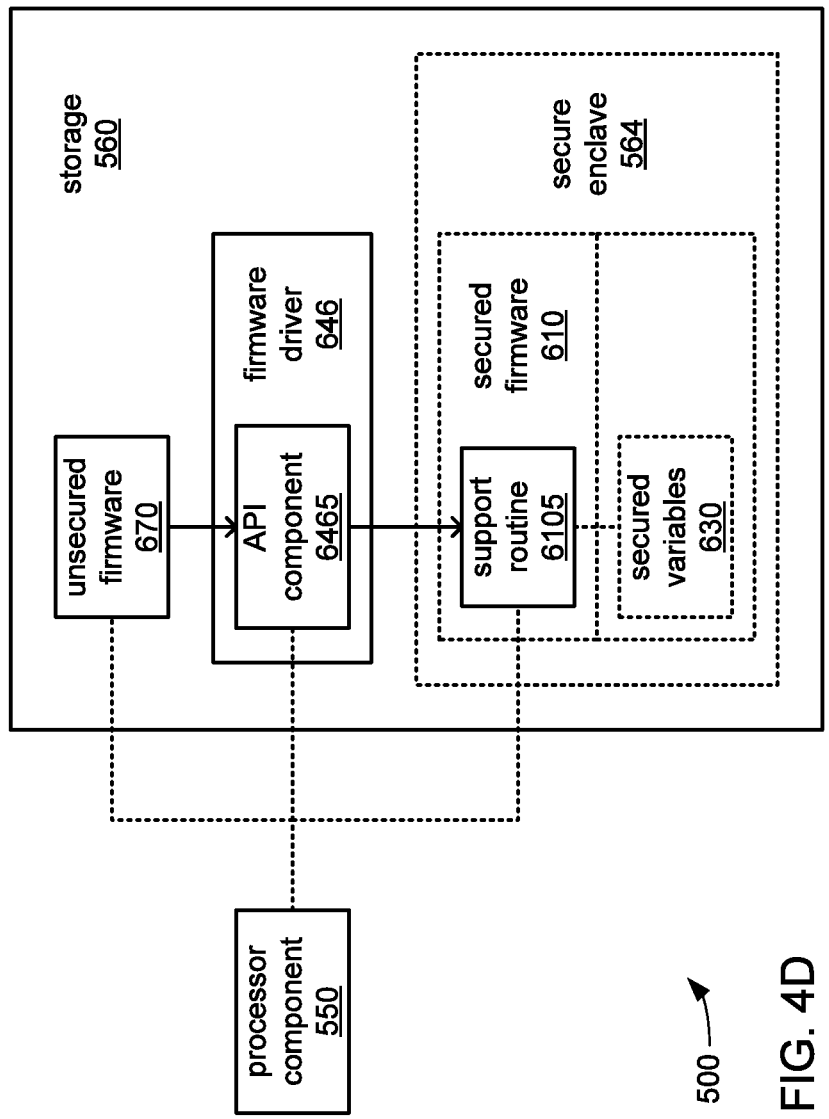

FIGS. 4A, 4B, 4C and 4D, together, depict aspects of such execution of the secured firmware 610 by the processor component 550 to perform various initialization and configuration tasks on various components of the processing device in the pre-OS operating environment to prepare the processing device to boot and execute the OS 770 in a subsequent OS operating environment. More specifically, FIG. 4A illustrates aspects of creating a secure enclave 564 within the storage 560, FIG. 4B illustrates aspects of loading the secured firmware 610 within the secure enclave 564, FIG. 4C illustrates aspects of taking a measure of the secure enclave 564, and FIG. 4D illustrates aspects of enabling the unsecured firmware 670 to make calls to one or more support routines 6105 of the secured firmware 610 from outside the secure enclave 564.

As depicted in FIG. 4A, the secured firmware 610 may include an enclave component 6104 such that execution of the secured firmware 610 by the processor component 550 may entail execution of the enclave component 6104. In some embodiments, the processor component 550 may execute instructions of the enclave component 6104 to directly create the secure enclave 564. It may be that the enclave component 6104 includes an indication of one or more ranges of addresses within the address space of the storage 560 that are to server as the location(s) of the secure enclave 564. The processor component 550 may therefore be made up of a set of storage locations (either contiguous or non-contiguous) within the storage 560 to which the processor component 550 limits access by any routine executed by the processor component 550 that is not within the secure enclave 564. Attempts by a routine executed by the processor component 550 to access a portion of the storage 560 that falls within the secure enclave 564 may result in the generation of an interrupt and/or trigger a form of exception processing by the processor component 550 in which the processor component 550 is caused to provide an error response to that routine, is caused to cease the execution of that routine, and/or is caused to take any of a variety of other actions to at least ensure that the attempted access is not successful, especially if it is an attempted write access.

In other embodiments, processor component 550 may execute instructions of the enclave component 6104 to trigger the processor component 450 of the controller 400 to create the secure enclave. In such embodiments in which the controller 400 performs various security functions (e.g., monitor the state of the processor component 550, control access to one or more components of the processing device 500, etc.), it may be that the processor component 450 acts to prevent accesses to the secure enclave 564 by the processor component 550 while executing a routine that is not within the secure enclave 564.

In some embodiments, at least a portion of the secure enclave 564 may be defined within a portion of the storage 560 that is implemented with volatile storage components, such as random access memory (RAM) that must be constantly supplied with electric power to continue to retain whatever is stored therein. As familiar to those skilled in the art, doing so may be deemed desirable since the current state of storage technologies is such that volatile storage components tend to be capable of supporting read and write accesses that are far faster than are able to be supported by non-volatile storage components such as FLASH that retain whatever is stored therein without a constant supply of electric power. However, it should be noted that other embodiments are possible in which at least a portion of the secure enclave 564 may be defined within a portion of the storage 560 that is implemented with non-volatile storage components, such as the portion of the storage 560 that is made up of the non-volatile storage 562.

As depicted in FIG. 4B, the secured firmware 610 may include a firmware loader 6106 such that execution of the secured firmware 610 by the processor component 550 may entail execution of the firmware loader 6106. The processor component 550 may execute instructions of the firmware loader 6106 to load at least a copy of the secured firmware 610 into the secure enclave 564 from the non-volatile storage 562. In so doing, the processor component 550 may also load copies of the unsecured firmware 670 and/or the firmware driver 646 from the non-volatile storage 562 and into another portion of the storage 560 that may be implemented with volatile storage devices enabling faster access by the processor component 550.

As also depicted in FIG. 4B, the secured firmware 610 may include one or more secured variables 630. Each of the one or more secured variables 630 may store a value employed or otherwise associated with a task that either provides security within the processing device 500 or is deemed desirable to keep secured from improper accesses and/or corruption by malicious software. An example of such a value may be a value indicating a setting that controls an aspect of booting the processing device 500; a value indicating an outcome of an attempted authentication of a component of the processing device 500; or a key, a hash value, a digital signature or other security credential used in encryption, decryption, authenticating a component of the processing device 500, or authenticating communications exchanged between the processing device 500 and another device.

In some embodiments, the one or more secured variables 630 may employ formatting and/or may be used in a manner conforming to aspects of the authenticated variables of the UEFI specification. Also, it should be noted that, although the one or more secured variables 630 are depicted and have been discussed as perhaps incorporated into the secured firmware 610 such that they are loaded into the secure enclave 564 as part of the secured firmware 610, other embodiments are possible in which the one or more secured variables 630 may be retrieved and/or loaded into the secure enclave 564 separately from the secured firmware 610. By way of example, the one or more secured variables 630 may include a variable retrieved from an entirely different storage device and/or from a register of a component of the processing device 500.

Turning to FIG. 4C, the processor component 550 may execute instructions of the enclave component 6104 to trigger the measuring component 555 to take a measure 530 of the secure enclave 564 with the secured firmware 610 loaded therein (either with or without the secured variables 630). In various embodiments, the measure 530 may be made up of one or more values derived through any of a variety of numeric calculations and/or bitwise operations, including and not limited to any of a variety of types of hash of the contents of at least a portion of the secure enclave 565 (e.g., a SHA-1, SHA-2 or other type of hash).

In some embodiments, the processor component 550 may cause at least an initial measure 530 to be taken following the loading of the secured firmware 610 and/or the secured variables 630 into the secure enclave 564. Such an initial measure 530 may then be retained by the measuring component 555 and/or within another component of the processing device 500 where the initial measure 530 in a manner that prevents tampering with the initial measure 530 such that the initial measure 530 remains available for use in comparisons to one or more measures 530 taken at later times to check the integrity of the contents of the secure enclave 564.

Alternatively or additionally, it may be a derivative of the initial measure 530 that may be so stored for use in such comparisons. By way of example, a key, a certificate or other security credential maintained within the secure enclave 564 (e.g., one of the secured variables 630, or one of the security credentials 246b or 267a embedded within or that otherwise accompanies the secured firmware 610) may be used to encrypt, digitally sign, take a hash of, or perform any of a variety of other operations on the initial measure 530 to generate an initial derivative thereof that may be retained within the measuring component 555 or within another component of the processing device 500. Alternatively, the initial measure 530 may be used as an encryption key to encrypt a predetermined value (e.g., one of the secured variables 630, or one of the security credentials 246b or 267a) to generate an initial derivative. It may be that the initial measure 530, itself, is deliberately discarded once the initial derivative has been generated. This may be deemed desirable to make prohibitively difficult any effort to reverse engineer the manner in which the initial measure 530 was itself generated from the secure enclave 564. A check of the integrity of the contents of the secure enclave 564 may then entail the taking of a new measure 530 followed by generating a new derivative of that new measure 530 using the same techniques as were employed to generate the initial derivative of the initial measure 530. The new derivative may then be compared to the initial derivative to check the integrity of the contents of the secure enclave 564.

As depicted in FIG. 4D, the secured firmware 610 may include one or more support routines 6105 such that execution of the secured firmware 610 by the processor component 550 may entail execution of the one or more support routines 6105. Each of the one or more support routines 6105 may either perform a function related to providing security (e.g., encryption/decryption, authentication, etc.) or perform a function that is deemed desirable to be performed in a secure environment (e.g., within the secure enclave 564). In so doing, and as also depicted in FIG. 4D, at least one of the one or more support routines 6105 may make use of at least one of the one or more secured variables 630. By way of example, where one of the secured variables 630 includes a security credential useable to perform encryption and/or decryption, one of the support routines 6105 may perform encryption and/or decryption, and may employ that one of the secured variables 630 to do so.

As also depicted in FIG. 4D, the firmware driver 646 may include an application programming interface (API) component 6465 such that execution of the firmware driver 646 by the processor component 550 may entail execution of the API component 6465. As the processor component 550 executes instructions of the unsecured firmware 670 to initialize and/or configure various aspects of the processing device 500 to prepare the processing device 500 to support execution of the OS 770, one or more routines within the unsecured firmware 670 may make calls to the one or more support routines 6105 of the secured firmware 610. To enable those calls to reach the one or more support routines 6105, the API component 6465 may provide those routines of the unsecured firmware 670 with an API to which those calls may be directed. As familiar to those skilled in the art, such an API may define a format, including aspects of parameters that may be conveyed, to which such calls may adhere. Upon receiving a call directed to the API to make use of a support routine 6105 of the secured firmware 610, the API component 6465 may relay indications of that call and/or its parameters to that support routine 6105 within the secure enclave 564 via whatever secure interface may be defined to enable communications between the firmware driver 646 and the secured firmware 610. Examples of such a secure interface include, and are not limited to, invocation of an interrupt, a buffer defined within the storage 560 and accessible to both the firmware driver 646 and the secured firmware 610, etc.

In some embodiments, the one or more support routines 6105 may include a support routine to simply read one of the secured variables 630 and provide its value back to a routine of the unsecured firmware 670 that requested that value, where that one of the secured variables 630 is allowed to be read, but not written to by routines that are external to the secure enclave 564. In other embodiments, the one or more support routines 6105 may include support routines that enable the secure storage of an amount of data in a manner using a key or other security credential using one call so that the same security credential or a related security credential would be required to retrieve that data from the secure storage using another call. Such an amount of data may be stored as one or more of the secured variables 630 within the secure enclave 564. In still other embodiments, the one or more support routines 6105 may include a support routine to perform a check of the integrity of the contents of the secure enclave 564 in the manner described above in reference to FIG. 4C. Thus, one or more routines of the unsecured firmware 670 may make calls to the API provided by the API component 6465 to make use of one or more of these examples of support routines 6105.

In some embodiments, calls made to the API component 6465 by a routine of the unsecured firmware 670 (and/or by other routines external to the secure enclave 564) may be calls to make use of authentication and/or encryption in exchanging data with a device coupled to the processing device 500. An example of such communications may be exchanges of data with one of the remote storage devices 305 via the network 999 where encryption is used in a manner that conforms to the Internet protocol security (IPSEC) specification promulgated by the Internet Engineering Taskforce (IETF) of Fremont, Calif. In such an example, a routine of the unsecured firmware 670 may make calls to the API provided by the API component 6465 for blocks of data to be exchanged with one of the remote storage device 305 using authentication and/or encryption. The API component 6465 may relay such calls to one or more of the support routines 6105 that perform such authentication and/or such encryption/decryption of blocks of data cause the one or more support routines 6105 to do so. In performing such authentication and/or such encryption/decryption, the one or more of the support routines 6105 that are so engaged may employ one or more security credentials that may be maintained among the one or more secured variables 630.

Returning to FIGS. 1A and 1B, with the secure enclave 564 created within the storage 560 and loaded with the secured firmware 610 and/or the secured variables 630, and with the completion of various initialization and/or configuration tasks performed by routines of the unsecured firmware 670 to prepare the processing device 500 to support execution of the OS 770, at least a portion of the OS 770 may be loaded and the processor component 550 may commence execution of that portion of the OS 770 as part of booting the OS 770. In this way, the transition may be made from the pre-OS operating environment to the OS operating environment.

Figure 5A:
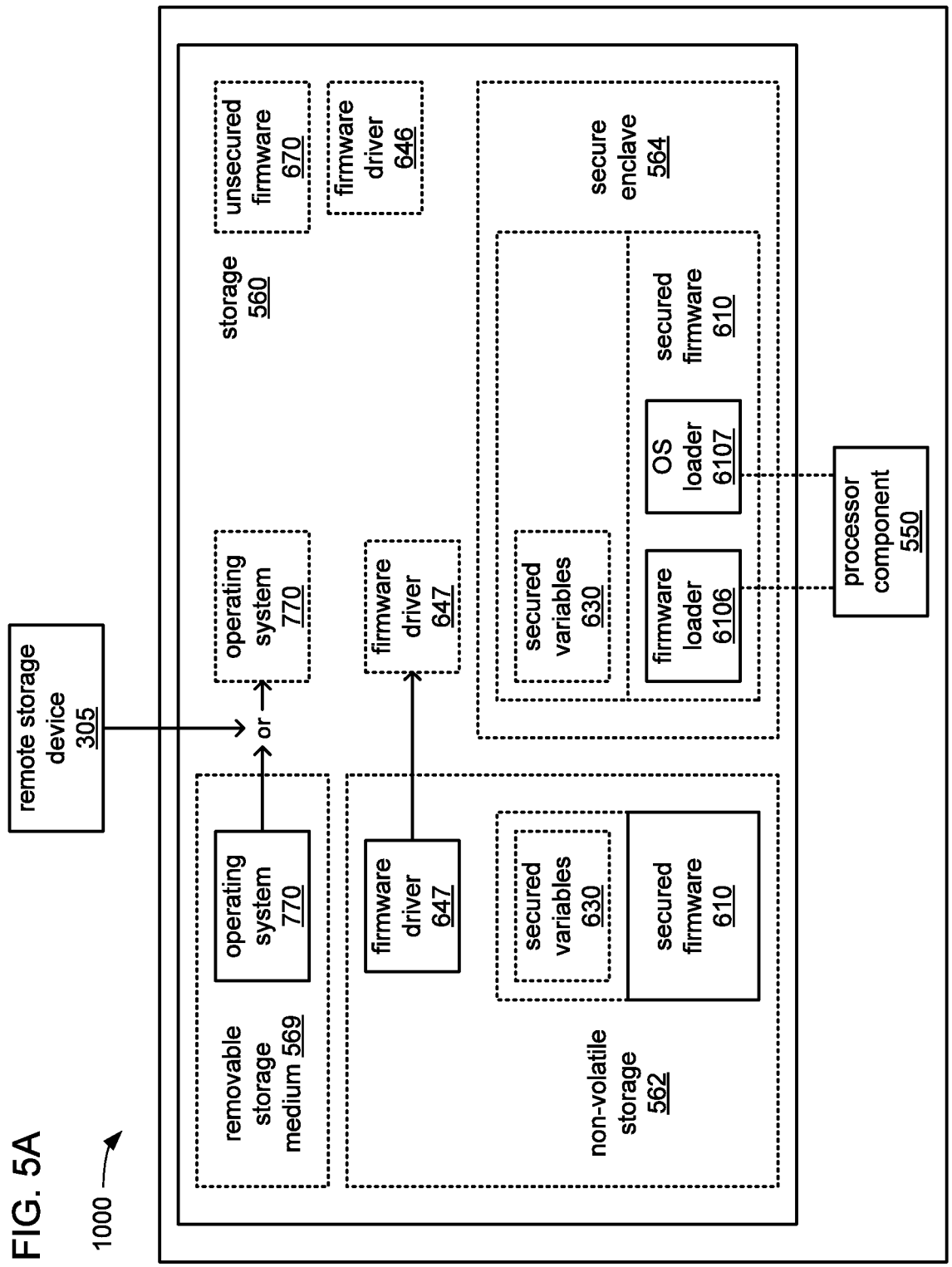
FIGS. 5A and 5B, together, illustrate an example embodiment of preserving a secure enclave in a transition between operating environments.
Figure 5B:
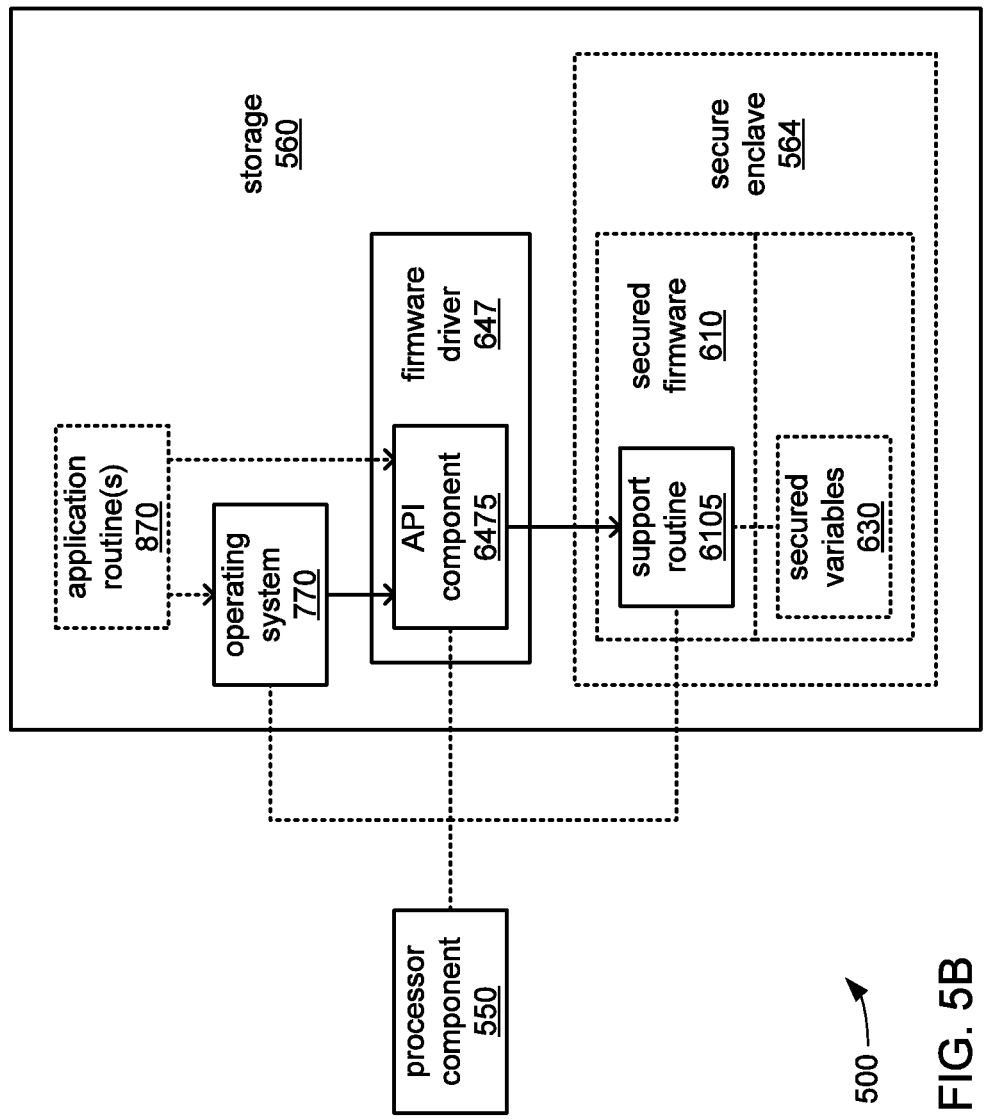

FIGS. 5A and 5B, together, depict aspects of such loading and commencement of execution of the OS 770 by the processor component 550. More specifically, FIG. 5A illustrates aspects of loading the OS 770, and FIG. 5B illustrates aspects of enabling the OS 770 and/or one or more of the application routines 870 to make a call to the one or more support routines 6105 of the secured firmware 610 from outside the secure enclave 564.

As depicted in FIG. 5A, in addition to the firmware loader 6106, the secured firmware 610 may include an OS loader 6107 such that execution of the secured firmware 610 by the processor component 550 may entail execution of the OS loader 6107. The processor component 550 may execute instructions of the OS loader 6107 to load a copy of at least a portion the OS 770 into a portion of the storage 560 that may be implemented with volatile storage devices from the removable storage medium 569 and/or from one of the remote storage devices 305 via the network 999. The processor component 550 may also load a copy of the firmware driver 647 from the non-volatile storage 562 into such a portion of the storage 560 that may be implemented with volatile storage devices.

Following such loading of at least a portion of the OS 770, the processor component 550 may cease to execute instructions of at least the unsecured firmware 670, and may commence execution of the loaded portion of the OS 770. It may be with the commencement of execution of the OS 770 that the transition is made from the pre-OS operating environment in which preparations were made for executing the OS 770 within the processing device 500, and to the OS operating environment in which the OS 770 is so executed. In so doing, in some embodiments, the unsecured firmware 670 and/or the firmware driver 646 may be cleared from at least a portion of the storage 560 that is implemented with volatile storage devices, and/or may be overwritten with portions of the OS 770 and/or portions of the one or more application routines 870. However, in other embodiments, the unsecured firmware 670 may and the firmware driver 646 may be maintained within a portion of the storage 560 that is implemented with volatile storage devices to remain available for use by the OS 770 and/or the one or more application routines 870. More specifically, the unsecured firmware 670 may include one or more support routines that may be called by the OS 770 and/or the one or more application routines 870 in addition to the support routines 6105 of the secured firmware 610 through an API provided by the unsecured firmware 670. Such support routines of the unsecured firmware 670 may perform functions that are neither related to providing security nor deemed to be in need of the security afforded by the secure enclave 564.

As depicted in FIG. 5B, the firmware driver 647 may include an API component 6475 such that execution of the firmware driver 647 by the processor component 550 may entail execution of the API component 6475. Succinctly, the API component 6475 of the firmware driver 647 may generate an API that enables routines of the OS 770 to make calls to the support routines 6105 of the secured firmware 610 in a manner similar to the provision of an API by the API component 6465 of the firmware driver 646 to enable routines of the unsecured firmware 670 to call those same support routines 6105 of the secured firmware 610. Thus, in addition to preserving the secure enclave 564 and its contents across two different operating environments, the ability of routines external to the secure enclave 564 to call the support routines 6105 maintained within the secure enclave 564 is also preserved across those two different operating environments.

As a result, functionality provided by the one or more support routines 6105 of the secured firmware 610 that was initially used by routines of the unsecured firmware 670 to prepare the processing device 500 to support execution of the OS 770 may subsequently be used by routines of the OS 770. Thus, for example, the earlier described support routine 6105 to simply read one of the secured variables 630 and provide its value that was callable by a routine of the unsecured firmware 670 may also be callable by a routine of the OS 770. Also, for example, the earlier described support routines 6105 that were callable by routines of the unsecured firmware 670 to securely store and later retrieve an amount of data in a manner using a key or other security credential may also be callable by routines of the OS 770. The OS 770 could use such calls to securely store an amount of data indicating various aspects of a current configuration of the processing device 500 at a time when the processing device 500 transitions from a higher power state to a lower power state (e.g., a so-called "sleep" or "hibernate" mode), and then the OS 770 could later use such calls to retrieve such an amount of data when the processing device 500 transitions from that lower power state back to that higher power state. Also, as still another example, the earlier described support routine 6105 to perform a check of the integrity of the contents of the secure enclave 564 in the manner described above in reference to FIG. 4C may also be callable by a routine of the OS 770.

With such an ability for both routines of the unsecured firmware 670 to make calls to the one or more support routines 6105 of the secured firmware 610 within the earlier pre-OS operating environment and routines of the OS 770 to make calls to the same one or more support routines 6105 of the secured firmware 610 within the later OS operating environment, a series of operations begun with such calls made by routines of the unsecured firmware 670 during the pre-OS operating environment may be continued with such calls made by routines of the OS 770 during the OS operating environment. By way of example, where a routine of the unsecured firmware 670 is to retrieve encrypted pieces of the OS 770 from either the removable storage medium 569 or a remote storage device 305 and then load those pieces in unencrypted form into a portion of the storage 560 that may be implemented with volatile storage devices during the pre-OS operating environment as part of preparing to execute the OS 770, that routine of the unsecured firmware 670 may make calls to one or more of the support routines 6105 to decrypt those encrypted pieces of the OS 770. Later, a routine of the OS 770 may then retrieve additional encrypted pieces of the OS 770 from either the removable storage medium 569 or the remote storage device 305 and then load those additional pieces in unencrypted form into that same portion of the storage 560 along with the earlier loaded pieces of the OS 770 during the OS operating environment in preparation to execute more of the OS 770, that routine of the OS 770 may make calls to the same one(s) of the support routines 6105 to decrypt those encrypted additional pieces of the OS 770.

In various embodiments, the processor components 450 and/or 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the network interface 590 may employ any of a wide variety of signaling technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6A:
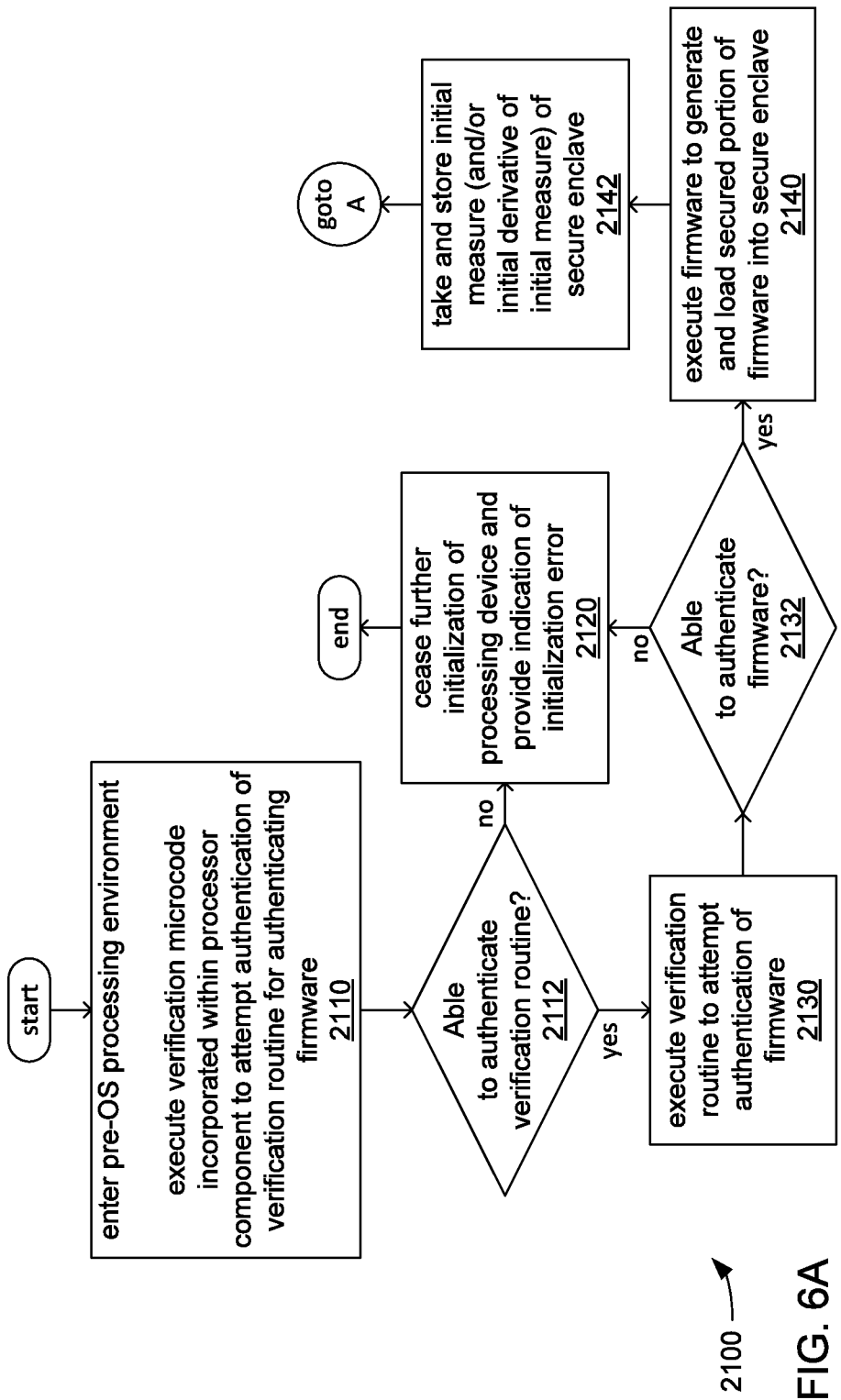
FIGS. 6A and 6B, together, illustrate a logic flow according to an embodiment.
Figure 6B:
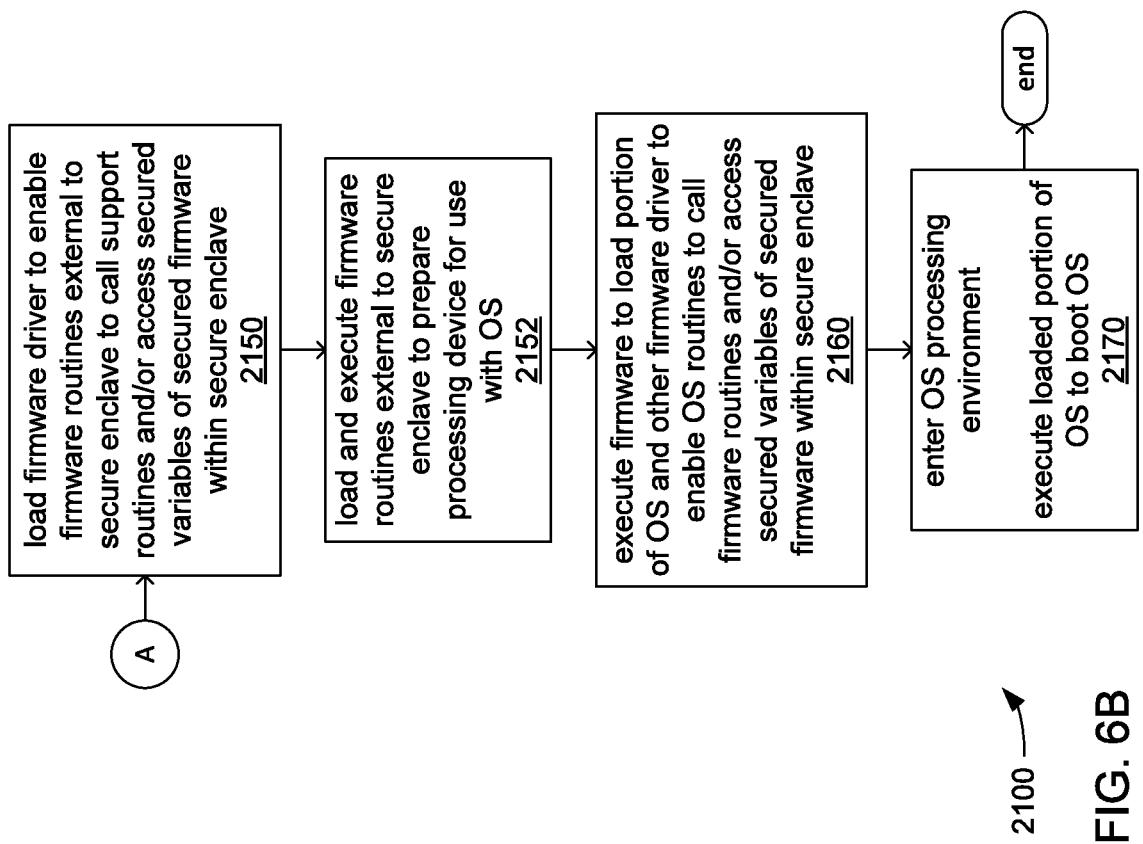

FIGS. 6A and 6B, together, illustrate an embodiment of a logic flow 2100. The logic flow 2100 may be representative of some or all of the operations executed by one or more embodiments described herein. More specifically, the logic flow 2100 may illustrate operations performed by one or both of the processor components 450 and 550 in executing one or more of the verification microcode 410, the verification routine 416, the secured firmware 610, and the unsecured firmware 670; and/or performed by other component(s) of the processing device 500. In particular, the logic flow 2100 is focused on operations to initialize and/or configure the processing device 500 as part of preparing the processing device 500 to support the execution of the OS 770.

At 2110, and at the start of a pre-OS processing environment, either a main processor component or a controller processor component of a processing device (e.g., one of the processor components 450 or 550 of the processing device 500) may execute verification microcode incorporated into that processor component (e.g., the verification microcode 410) to attempt to authenticate a verification routine for authenticating a firmware (e.g., the verification routine 416). If, at 2112, the verification routine is not able to be authenticated, then at 2120, the main or controller processor component that executes the verification microcode may cease any further operations to initialize the processing device (or may cause a reboot). Further, that processor component may operate a display and/or another component of the processing device to provide an indication of an error in the initialization of the processing device.

However, if the verification routine is able to be authenticated at 2112, then the main processor component may execute the verification routine at 2130 to attempt to authenticate the firmware. At 2132, if the firmware could not be authenticated, then at 2120, the main processor component may cease any further operations to initialize the processing device. Further, the main processor component may operate a display and/or another component of the processing device to provide an indication of an error in the initialization of the processing device.

However, if the firmware was able to be authenticated at 2132, then at 2140, the main processor component may commence executing the firmware to continue the initialization of the processing device. In so doing, the main processor component may be caused to generate a secure enclave and may load at least a secured portion of the firmware into the secure enclave (e.g., the secure enclave 564 into which at least the secured firmware 610 may be loaded, and where the secured firmware 610 may include one or more secured variables 630).

At 2142, the main processor component may cause an initial measure to be taken of the contents of the secure enclave. More precisely, and as previously discussed, hardware-based logic of a circuit of the processing device (e.g., the measuring component 555) may be triggered by the main processor component (or through cooperation between the main and controller processor components) to take the initial measure, and may also store the initial measure. Alternatively or additionally, an initial derivative may be generated by encrypting, taking a hash of, digitally signing or otherwise processing the initial measure using any of a variety of security credentials, where such security credentials may have been stored within the secure enclave as a secured variable and/or may be a security credential associated with authenticating at least the secured portion of the firmware. However, as another alternative, the initial derivative may be generated by using the initial measure as a security credential to encrypt, digitally sign, or otherwise process a predetermined value that may have been stored within the secure enclave as a secured variable.

At 2150, the main processor component may load a firmware driver (e.g., the firmware driver 646) to enable routines of another portion of the firmware that is external to the secure enclave (e.g., routines of the unsecured firmware 670) to make calls to support routines of the secured portion of the firmware loaded into the secure enclave and/or to access one or more secured variables loaded into the secure enclave. As has been discussed, it may be that one or more of the support routines of the secured portion of the firmware are callable through the firmware driver to provide access (e.g., read-only access, or read/write access) to one or more of such secured variables.

At 2152, the main processor component may load the other portion of the firmware that is external to the secure enclave, and may commence execution of that other portion to perform operations to initialize and/or configure various aspects of the computing device to prepare the computing device to support the execution of an OS (e.g., the OS 770). As has been discussed, the loading of the firmware driver and/or of the other portion of the firmware may entail retrieving copies of one or both from a portion of storage implemented with non-volatile storage devices and storing those copies into another portion of the storage implemented with volatile storage devices to gain the benefit of faster access to enable faster execution.

At 2160, in executing the other portion of the firmware that is external to the secure enclave, the main processor component may be caused to load a portion of the OS to enable the booting of the OS and is caused to load another firmware driver to enable routines of the OS to make calls to the support routines of the secured portion of the firmware loaded into the secure enclave and/or to access one or more secured variables loaded into the secure enclave. As has been discussed, it may be that routines of the OS will make calls to the very same support routines of the secured portion of the firmware that the routines of the other portion of the firmware call. As has been discussed, the loading of portions of the OS may entail retrieving copies of those portions from a portion of storage implemented with non-volatile storage devices, a removable storage medium (e.g., the removable storage medium 569) and/or a remote storage device (e.g., one of the remote storage devices 305), and storing those portions into another portion of the storage implemented with volatile storage devices to gain the benefit of faster access to enable faster execution. At 2170, the pre-OS operating environment is supplanted by an OS operating environment as the main processor commences executing the portion of the OS that was earlier loaded at 2160.

Figure 7A:
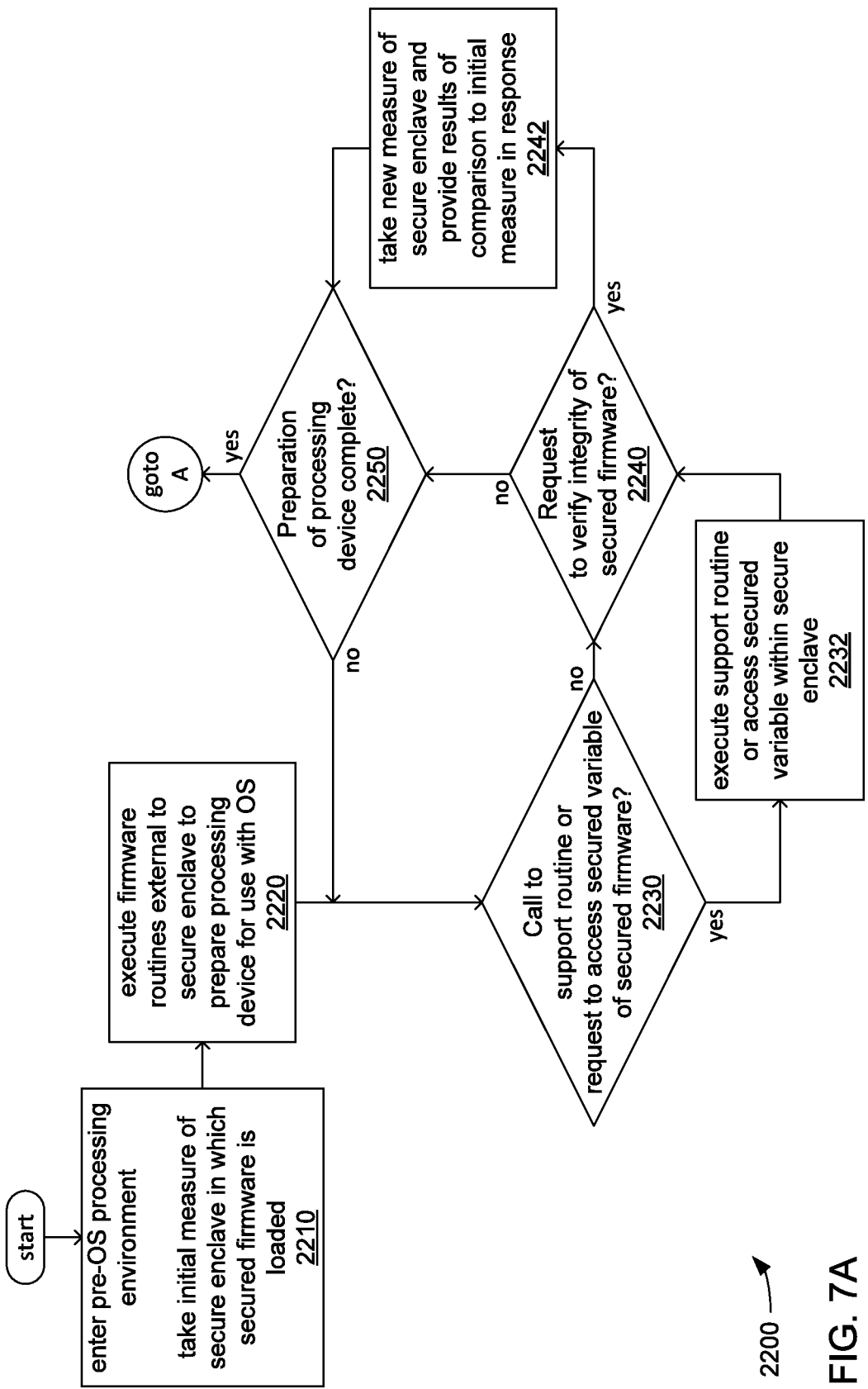
FIGS. 7A and 7B, together, illustrate another logic flow according to an embodiment.
Figure 7B:
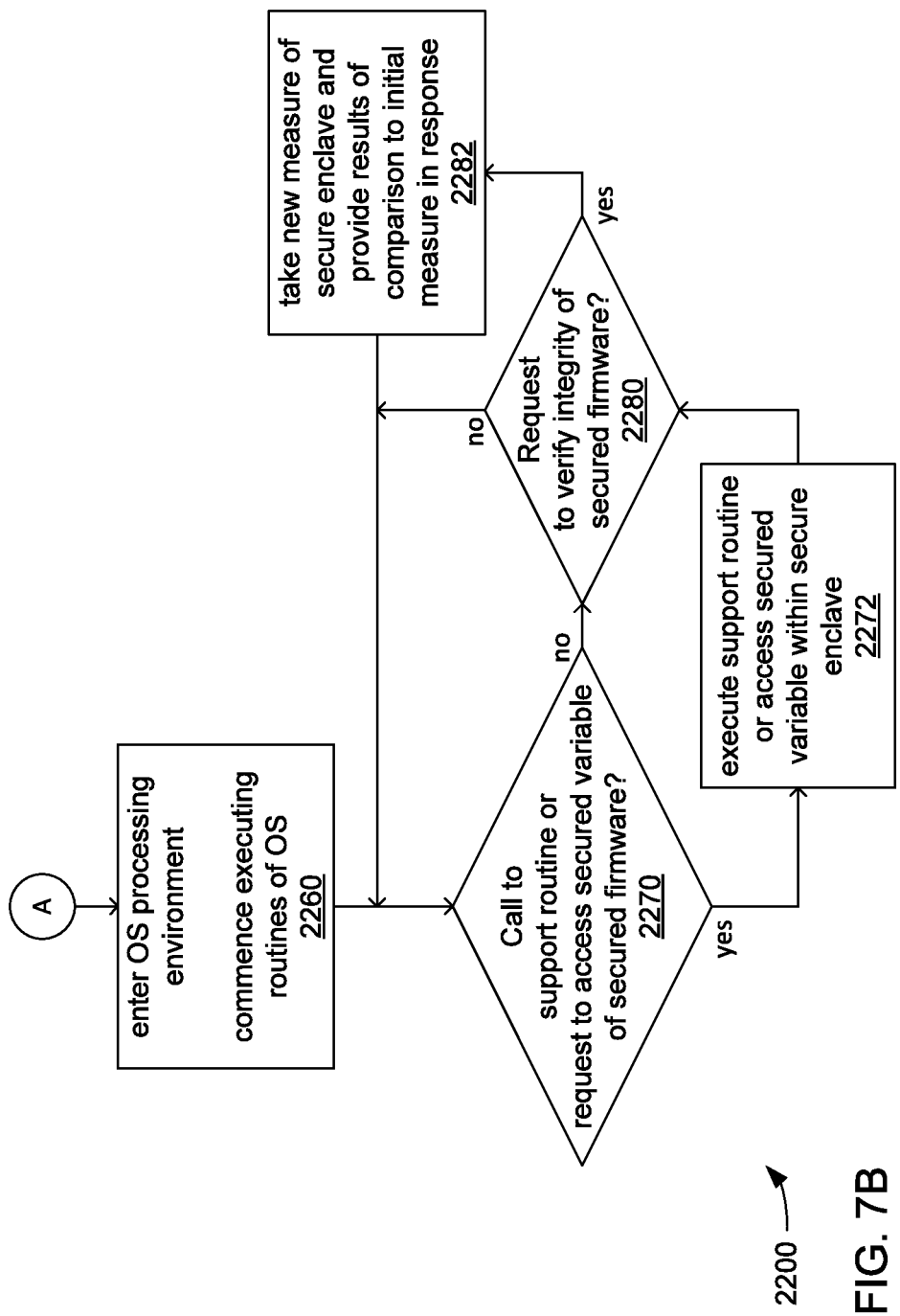

FIGS. 7A and 7B, together, illustrate an embodiment of a logic flow 2200. The logic flow 2200 may be representative of some or all of the operations executed by one or more embodiments described herein. More specifically, the logic flow 2200 may illustrate operations performed by the processor components 550 in executing one or more of the secured firmware 610, the firmware driver 646, the firmware driver 647, the unsecured firmware 670, the OS 770 and an application routine 870; and/or performed by other component(s) of the processing device 500. In particular, the logic flow 2200 is focused on operations to preparing the processing device 500 to support the execution of the OS 770 in the pre-OS operating environment, and to support the execution of the OS 770 as it is executed in the OS operating environment.

At 2210, and at the start of a pre-OS processing environment, a main processor component of a processing device (e.g., the processor component 550 of the processing device 500) may cause an initial measure to be taken of the contents of a secure enclave into which a secured portion of a firmware of the processing device has been loaded (e.g., the secure enclave 564 into which the secured firmware 610 may be loaded, which may include one or more secured variables 630). Again, more precisely, hardware-based logic of a circuit of the processing device (e.g., the measuring component 555) may be triggered to take the initial measure, and may also store the initial measure and/or an initial derivative thereof.

At 2220, the main processor component may commence execution of another portion of the firmware that is external to the secure enclave (e.g., the unsecured firmware 670) to perform operations to initialize and/or configure various aspects of the computing device to prepare the computing device to support the execution of an OS (e.g., the OS 770). As has been discussed, the loading of portions of the firmware may entail retrieving copies of those portions from a portion of storage implemented with non-volatile storage devices and storing those copies into another portion of the storage implemented with volatile storage devices to gain the benefit of faster access to enable faster execution.

At 2230, a check is made as to whether a call to a support routine of the secured portion of the firmware (e.g., one of the support routines 6105 of the secured firmware 610) has been received from a routine of the unsecured portion of the firmware. If so, then the main processor component executes that support routine at 2232 to perform the function requested by the call. As has been discussed, since the support routines of the secured portion of the firmware are within the secure enclave, while the routines of the unsecured portion of the firmware are external to the secure enclave, such calls from routines of the unsecured portion of the firmware may be relayed by a firmware driver (e.g., the firmware driver 646) to the routines of the secured portion of the firmware to which those calls are directed.

Regardless of whether such a call was received at 2230, at 2240, a check is made as to whether a request to verify the integrity of the secured portion of the firmware has been received from a routine of the unsecured portion of the firmware. If so, then at 2242, the main processor component causes a new measure to be taken of the contents of the secure enclave and a comparison to be made between the new measure and the initial measure, or between a new derivative of the new measure and the initial derivative of the initial measure to determine whether the contents of the secure enclave have remained unchanged since the initial measure was taken. The main processor component may then provide an indication of the results of the comparison to the routine of the unsecured portion of the firmware that requested it.

Regardless of whether such a request was received at 2240, at 2250, a check is made as to whether the routines of the unsecured portion of the firmware have completed their tasks to initialize and/or configure components of the processing device to prepare the processing device to support execution of the OS. If not, then the check for a call to a support routine of the secured portion of the firmware is repeated at 2230. However, if such preparations have been completed at 2250, then the pre-OS operating environment is supplanted by an OS operating environment of the OS as the main processor commences executing routines of the OS at 2260.

At 2270, a check is made as to whether a call to a support routine of the secured portion of the firmware has been received from a routine of the OS. If so, then the main processor component executes that support routine at 2272 to perform the function requested by the call. As has been discussed, such calls from routines of the OS may be relayed by another firmware driver (e.g., the firmware driver 647) to the routines of the secured portion of the firmware to which those calls are directed in a manner that may be similar to the relaying of calls by routines of the unsecured portion of the firmware at 2232.

Regardless of whether such a call was received at 2270, at 2280, a check is made as to whether a request to verify the integrity of the secured portion of the firmware has been received from a routine of the OS. If so, then at 2282, the main processor component causes a new measure to be taken of the contents of the secure enclave and a comparison to be made between the new measure and the initial measure, or between a new derivative of the new measure and the initial derivative of the initial measure to determine whether the contents of the secure enclave have remained unchanged since the initial measure was taken. As has been discussed, the manner in which such a check is carried out in response to a request from a routine of the OS in the OS operating environment may be similar to the manner in which such a check is carried out in response to a request from a routine of the unsecured portion of the firmware in the pre-OS operating environment. The main processor component may then provide an indication of the results of the comparison to the routine of the unsecured portion of the firmware that requested it.

Regardless of whether such a request was received at 2280, the check at 2270 may be repeated. Indeed, as long as the OS continues to be executed by the main processor component such that the OS operating environment remains in place, the checks at 2270 and 2280 may be recurringly made.

Figure 8:
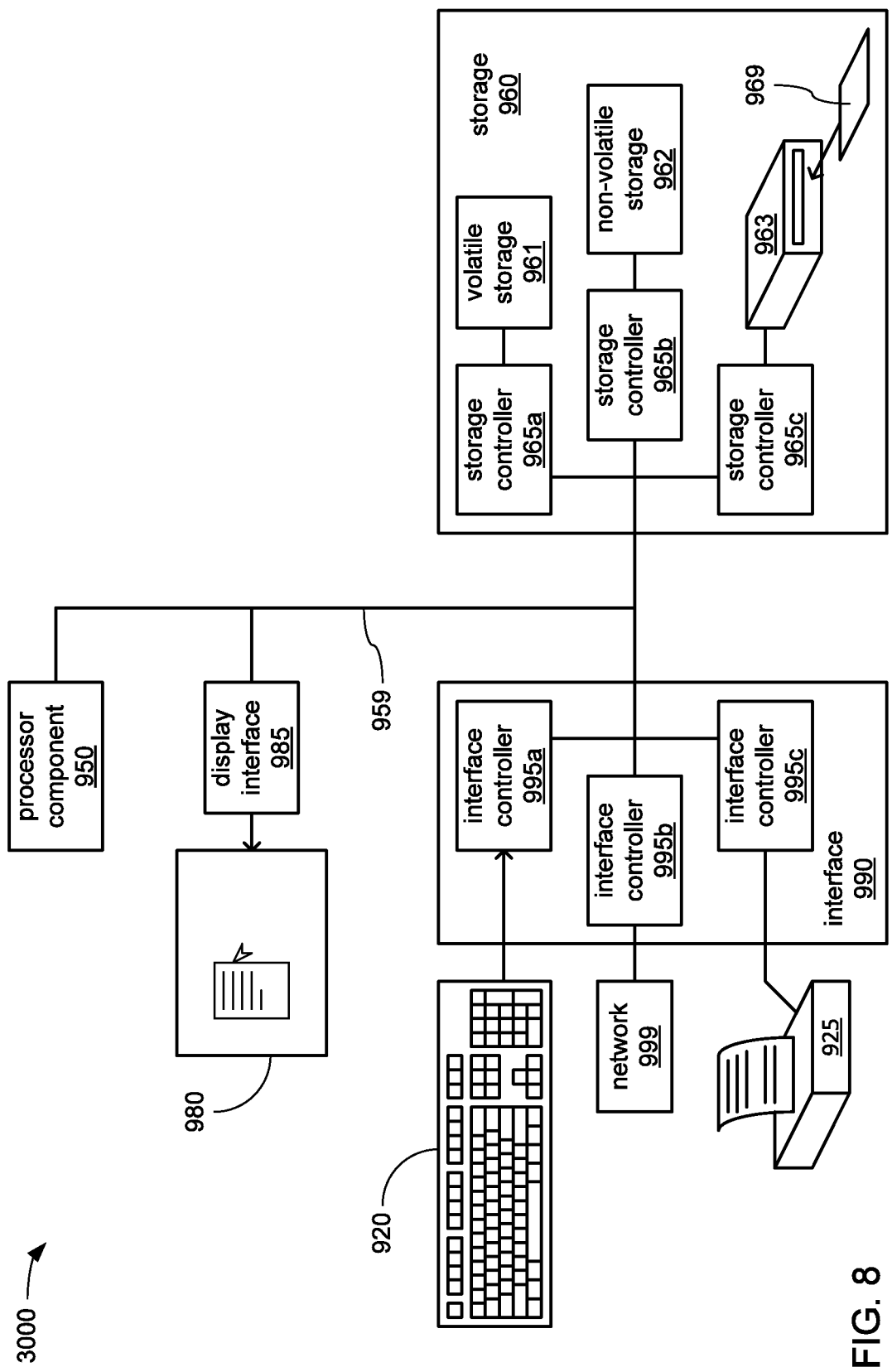
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of one or more of the devices 100, 200, 304, 305 or 500, and/or the controller 400. It should be noted that components of the processing architecture 3000 are given reference numbers in which the last two digits correspond to the last two digits of reference numbers of at least some of the components earlier depicted and described as part of these devices and/or controllers. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). By way of illustration, both an application running on a server and the server can be a component. One or more components can reside within a process and/or thread of execution, and a component can be localized on one device and/or distributed between two or more devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a device includes at least a processor component 950, a storage 960, an interface 990 to other devices, and a coupling 959. As will be explained, depending on various aspects of a device implementing the processing architecture 3000, including its intended use and/or conditions of use, such a device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended)

(PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between devices). This depiction of the storage 960 as possibly including multiple distinct types of storage is in recognition of the commonplace use of more than one type of storage device in devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a device to one or more other devices. Again, one or both of various forms of wired or wireless signaling may be employed to enable the processor component 950 to interact with input/output devices (e.g., the depicted example keyboard 920 or printer 925) and/or other devices, possibly through a network (e.g., the network 999) or an interconnected set of networks. In recognition of the often greatly different character of multiple types of signaling and/or protocols that must often be supported by any one device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other devices through the depicted network 999 (perhaps a network made up of one or more links, smaller networks, or perhaps the Internet). More specifically, the interface controller 995*b* may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface controller 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a device is communicatively coupled to (or perhaps, actually incorporates) a display (e.g., the depicted example display 980), such a device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a first processor component; a volatile storage coupled to the first processor component; an enclave component to, in a pre-operating system (pre-OS) operating environment, generate a secure enclave within a portion of the volatile storage to restrict access to a secured firmware loaded into the secure enclave; a first firmware driver to, in the pre-OS operating environment, provide a first application programming interface (API) to enable unsecured firmware to call a support routine of the secured firmware from outside the secure enclave; and a second firmware driver to, in an OS operating environment that replaces the pre-OS operating environment, provide a second API to enable an OS of the OS operating environment to call the support routine from outside the secure enclave.

In Example 2, which includes the subject matter of Example 1, the apparatus may include a non-volatile storage coupled to the first processor component to store the secured firmware prior to loading of the secured firmware into the secure enclave; and a verification routine to attempt to authenticate the secured firmware within the non-volatile storage prior to generation of the secure enclave to include at least the verification routine and the secured firmware in a chain of trust.

In Example 3, which includes the subject matter of any of Examples 1-2, the secured firmware may include the enclave component and a firmware loader, the enclave component to generate the secure enclave and the firmware loader to load secured firmware into the secure enclave after successful authentication of the secured firmware by the verification routine to extend the chain of trust to include the secure enclave.

In Example 4, which includes the subject matter of any of Examples 1-3, the first processor component may include verification microcode to, in response to initialization of a processing device to start the pre-OS operating environment within the processing device, attempt to authenticate the verification routine prior to the verification routine attempting to authenticate the secured firmware to start the chain of trust with the verification microcode.

In Example 5, which includes the subject matter of any of Examples 1-4, the apparatus may include a second processor component, the second processor component may include verification microcode to, in response to initialization of a processing device to start the pre-OS operating environment within the processing device, attempt to authenticate the verification routine prior to the verification routine attempting to authenticate the secured firmware to start the chain of trust with the verification microcode and the second processor component.

In Example 6, which includes the subject matter of any of Examples 1-5, the enclave component may cause the first processor component to trigger the second processor component to generate the secure enclave.

In Example 7, which includes the subject matter of any of Examples 1-6, the apparatus may include a measuring component to, in the pre-OS operating environment, generate an initial measure of contents of the secure enclave after loading of the secured firmware into the secure enclave and prior to use of the support routine by the unsecured firmware via the first API.

In Example 8, which includes the subject matter of any of Examples 1-7, the first processor component may include the measuring component.

In Example 9, which includes the subject matter of any of Examples 1-8, the measuring component may, in the pre-OS operating environment, generate another measure of the contents of the secure enclave and to compare the other measure to the initial measure in response to a call from the unsecured firmware to the support routine via the first API to authenticate the secured firmware.

In Example 10, which includes the subject matter of any of Examples 1-9, the measuring component may, in the OS operating environment, generate another measure of the contents of the secure enclave and to compare the other measure to the initial measure in response to a call from the OS to the support routine via the second API to authenticate the secured firmware.

In Example 11, which includes the subject matter of any of Examples 1-10, the support routine may access a secured variable stored within the secure enclave in response to at least one of a call to the support routine from the unsecured firmware via the first API in the pre-OS operating environment or a call to the support routine from the OS via the second API in the OS operating environment.

In Example 12, which includes the subject matter of any of Examples 1-11, the secured variable may include a security credential, and the support routine to employ the secured variable in at least one of encrypting transmitted data, decrypting received data or accessing stored data.

In Example 13, which includes the subject matter of any of Examples 1-12, the secured firmware may include an OS loader to, in the pre-OS environment, load at least a portion of the OS into the volatile storage and outside of the secure enclave in preparation for replacing the pre-OS operating environment with the OS operating environment.

In Example 14, which includes the subject matter of any of Examples 1-13, the secured firmware may attempt to, in the pre-OS environment, authenticate the OS prior to loading of the at least a portion of the OS into the volatile storage.

In Example 15, an apparatus includes a first processor component of a processing device; a volatile storage of the processing device; an enclave component to, in a pre-operating system (pre-OS) operating environment of the processing device, generate a secure enclave within a portion of the volatile storage to restrict access to a secured variable loaded into the secure enclave; a first firmware driver to, in the pre-OS operating environment, provide a first application programming interface (API) to enable unsecured firmware to call a support routine from outside the secure enclave to access the secured variable; and a second firmware driver to, in an OS operating environment that replaces the pre-OS operating environment, provide a second API to enable an OS of the OS operating environment to call the support routine to access the secured variable from outside the secure enclave.

In Example 16, which includes the subject matter of Example 15, the apparatus may include a non-volatile storage coupled of the processing device to store the secured variable prior to loading of the secured variable into the secure enclave; a verification routine to attempt to authenticate a secured firmware within the non-volatile storage prior to generation of the secure enclave to include at least the verification routine and the secured firmware within a chain of trust, the secured firmware may include the enclave component; and a firmware loader incorporated into the secured firmware to load the secured variable and the secured firmware into the secure enclave after successful authentication of the secured firmware by the verification routine to extend the chain of trust to include the secure enclave.

In Example 17, which includes the subject matter of any of Examples 15-16, the first processor component may include verification microcode to, in response to initialization of the processing device to start the pre-OS operating environment within the processing device, attempt to authenticate the verification routine prior to the verification routine attempting to authenticate the secured firmware to start the chain of trust with the verification microcode.

In Example 18, which includes the subject matter of any of Examples 15-17, the first processor component may, in response to a failure to authenticate the verification routine or the secured firmware, refrain from performing further initialization of the processing device, restart initialization of the processing device or operate a network interface of the processing device to transmit an indication of the failure to another device via a network.

In Example 19, which includes the subject matter of any of Examples 15-18, the apparatus may include a second processor component of the processing device, and the second processor component may include verification microcode to, in response to initialization of the processing device to start the pre-OS operating environment within the processing device, attempt to authenticate the verification routine prior to the verification routine attempting to authenticate the secured firmware to start the chain of trust with the verification microcode and the second processor component.

In Example 20, which includes the subject matter of any of Examples 15-19, the enclave component may cause the first processor component to trigger the second processor component to generate the secure enclave.

In Example 21, which includes the subject matter of any of Examples 15-20, the processing device may include a measuring component to, in the pre-OS operating environment, generate an initial measure of contents of the secure enclave after loading of the secured firmware into the secure enclave and prior to access to the secured variable by the unsecured firmware via the first API.

In Example 22, which includes the subject matter of any of Examples 15-21, the first processor component may include the measuring component.

In Example 23, which includes the subject matter of any of Examples 15-22, the measuring component may, in the pre-OS operating environment, generate another measure of the contents of the secure enclave and to compare the other measure to the initial measure in response to a call from the unsecured firmware via the first API to authenticate the secured firmware.

In Example 24, which includes the subject matter of any of Examples 15-23, the measuring component may, in the OS operating environment, generate another measure of the contents of the secure enclave and to compare the other measure to the initial measure in response to a call from the OS via the second API to authenticate the secured firmware.

In Example 25, which includes the subject matter of any of Examples 15-24, the apparatus may include a network interface to couple the processing device to a network, the secured variable may include a security credential to support data encryption in communications through the network interface, the secured firmware may include the support routine, and the support routine may use the secured variable to encrypt data transmitted to another device via the network or to decrypt data received from another device at the network interface.

In Example 26, which includes the subject matter of any of Examples 15-25, the apparatus may include a non-volatile storage component of the processing device, the secured variable may include a security credential to support accessing data stored within the non-volatile storage component, the secured firmware may include the support routine, and the support routine may use the secured variable to authenticate a password received by the processing device to grant access to the data stored within the non-volatile storage component or to use the secured variable to decrypt the data stored within the non-volatile storage.

In Example 27, a computing-implemented method includes in a pre-operating system (pre-OS) operating environment, generating a secure enclave within a portion of volatile storage of a processing device; loading into the secure enclave, in the pre-OS operating environment, a secured firmware stored in a non-volatile storage of the processing device; loading into the volatile storage and outside of the secure enclave, in the pre-OS operating environment, a first firmware driver and a second firmware driver stored in the non-volatile storage; executing, in the pre-OS operating environment, the first firmware driver to provide a first application programming interface (API) to enable unsecured firmware to call a support routine of the secured firmware from outside the secure enclave in the pre-OS operating environment; and executing, in an OS operating environment that replaces the pre-OS operating environment, the second firmware driver to provide a second API to enable an OS of the OS operating environment to call the support routine from outside the secure enclave in the OS operating environment.

In Example 28, which includes the subject matter of Example 27, the method may include executing, by a first processor component the processing device, a verification routine to attempt to authenticate the secured firmware within the non-volatile storage prior to generation of the secure enclave to include at least the verification routine and the secured firmware within a chain of trust; and executing, by the first processor component, the secured firmware to generate the secure enclave and to load the secured firmware into the secure enclave after successful authentication of the secured firmware by the verification routine to extend the chain of trust to include the secure enclave.

In Example 29, which includes the subject matter of any of Examples 27-28, the method may include, in response to initialization of the processing device to start the pre-OS operating environment within the processing device, executing verification microcode incorporated into the first processor component to attempt to authenticate the verification routine prior to the verification routine attempting to authenticate the secured firmware to start the chain of trust with the verification microcode.

In Example 30, which includes the subject matter of any of Examples 27-29, the method may include, in response to a failure to authenticate the verification routine or the secured firmware, at least one of refraining from performing further initialization of the processing device, restarting initialization of the processing device, or operating a network interface of the processing device to transmit an indication of the failure to another device via a network.

In Example 31, which includes the subject matter of any of Examples 27-30, the method may include, in response to initialization of the processing device to start the pre-OS operating environment within the processing device, executing verification microcode incorporated into a second processor component to attempt to authenticate the verification routine prior to the verification routine attempting to authenticate the secured firmware to start the chain of trust with the verification microcode and the second processor component.

In Example 32, which includes the subject matter of any of Examples 27-31, generating the secure enclave may include the first processor component triggering the second processor component to generate the secure enclave.

In Example 33, which includes the subject matter of any of Examples 27-32, the method may include generating an initial measure of contents of the secure enclave in the pre-OS operating environment after loading of the secured firmware into the secure enclave and prior to use of the support routine by the unsecured firmware via the first API.

In Example 34, which includes the subject matter of any of Examples 27-33, the method may include generating another measure of the contents of the secure enclave and comparing the other measure to the initial measure in the pre-OS operating environment in response to a call from the unsecured firmware to the support routine via the first API to authenticate the secured firmware.

In Example 35, which includes the subject matter of any of Examples 27-34, the method may include generating another measure of the contents of the secure enclave and comparing the other measure to the initial measure in the OS operating environment in response to a call from the OS to the support routine via the second API to authenticate the secured firmware.

In Example 36, which includes the subject matter of any of Examples 27-35, the method may include executing the support routine to access a secured variable stored within the secure enclave in response to at least one of a call to the support routine from the unsecured firmware via the first API in the pre-OS operating environment or a call to the support routine from the OS via the second API in the OS operating environment.

In Example 37, which includes the subject matter of any of Examples 27-36, the processing device may include a network interface to couple the processing device to a network, the secured variable may include a security credential to support data encryption in communications through the network interface, and the support routine may use the secured variable to encrypt data transmitted to another device via the network or to decrypt data received from another device at the network interface.

In Example 38, which includes the subject matter of any of Examples 27-37, the processing device may include a non-volatile storage component, the secured variable may include a security credential to support accessing data stored within the non-volatile storage component, and the support routine may use the secured variable to authenticate a password received by the processing device to grant access to the data stored within the non-volatile storage component or to use the secured variable to decrypt the data stored within the non-volatile storage.

In Example 39, which includes the subject matter of any of Examples 27-38, the method may include executing, in the pre-OS environment, an OS loader of the secure firmware to load at least a portion of the OS into the volatile storage and outside of the secure enclave in preparation for replacing the pre-OS operating environment with the OS operating environment.

In Example 40, which includes the subject matter of any of Examples 27-39, the method may include executing, in the pre-OS environment, the secured firmware to attempt to authenticate the OS prior to loading of the at least a portion of the OS into the volatile storage.

In Example 41, at least one tangible machine-readable storage medium includes instructions that when executed by a processing device, may cause the processing device to in a pre-operating system (pre-OS) operating environment, generate a secure enclave within a portion of volatile storage; load into the secure enclave, in the pre-OS operating environment, a secured firmware stored in a non-volatile storage; load into the volatile storage and outside of the secure enclave, in the pre-OS operating environment, a first firmware driver and a second firmware driver stored in the non-volatile storage; execute, in the pre-OS operating environment, the first firmware driver to provide a first application programming interface (API) to enable unsecured firmware to call a support routine of the secured firmware from outside the secure enclave in the pre-OS operating environment; and executing, in an OS operating environment that replaces the pre-OS operating environment, the second firmware driver to provide a second API to enable an OS of the OS operating environment to call the support routine from outside the secure enclave in the OS operating environment.

In Example 42, which includes the subject matter of Example 41, the processing device may be caused to execute, by a first processor component the processing device, a verification routine to attempt to authenticate the secured firmware within the non-volatile storage prior to generation of the secure enclave to include at least the verification routine and the secured firmware within a chain of trust; and execute, by the first processor component, the secured firmware to generate the secure enclave and to load the secured firmware into the secure enclave after successful authentication of the secured firmware by the verification routine to extend the chain of trust to include the secure enclave.

In Example 43, which includes the subject matter of any of Examples 41-42, the processing device may be caused to, in response to initialization of the processing device to start the pre-OS operating environment within the processing device, execute verification microcode incorporated into the first processor component to attempt to authenticate the verification routine prior to the verification routine attempting to authenticate the secured firmware to start the chain of trust with the verification microcode.

In Example 44, which includes the subject matter of any of Examples 41-43, the processing device may be caused to, in response to a failure to authenticate the verification routine or the secured firmware, at least one of refrain from performing further initialization of the processing device, restart initialization of the processing device, or operate a network interface of the processing device to transmit an indication of the failure to another device via a network.

In Example 45, which includes the subject matter of any of Examples 41-44, the processing device may be caused to, in response to initialization of the processing device to start the pre-OS operating environment within the processing device, execute verification microcode incorporated into a second processor component to attempt to authenticate the verification routine prior to the verification routine attempting to authenticate the secured firmware to start the chain of trust with the verification microcode and the second processor component.

In Example 46, which includes the subject matter of any of Examples 41-45, the first processor component may trigger the second processor component to generate the secure enclave.

In Example 47, which includes the subject matter of any of Examples 41-46, the processing device may be caused to generate an initial measure of contents of the secure enclave in the pre-OS operating environment after loading of the secured firmware into the secure enclave and prior to use of the support routine by the unsecured firmware via the first API.

In Example 48, which includes the subject matter of any of Examples 41-47, the processing device may be caused to generate another measure of the contents of the secure enclave and compare the other measure to the initial measure in the pre-OS operating environment in response to a call from the unsecured firmware to the support routine via the first API to authenticate the secured firmware.

In Example 49, which includes the subject matter of any of Examples 41-48, the processing device may be caused to generate another measure of the contents of the secure enclave and compare the other measure to the initial measure in the OS operating environment in response to a call from the OS to the support routine via the second API to authenticate the secured firmware.

In Example 50, which includes the subject matter of any of Examples 41-49, the processing device may be caused to execute the support routine to access a secured variable stored within the secure enclave in response to at least one of a call to the support routine from the unsecured firmware via the first API in the pre-OS operating environment or a call to the support routine from the OS via the second API in the OS operating environment.

In Example 51, which includes the subject matter of any of Examples 41-50, the processing device may include a network interface to couple the processing device to a network, the secured variable may include a security credential to support data encryption in communications through the network interface, and the support routine may use the secured variable to encrypt data transmitted to another device via the network or to decrypt data received from another device at the network interface.

In Example 52, which includes the subject matter of any of Examples 41-51, the processing device may include a non-volatile storage component, the secured variable may include a security credential to support accessing data stored within the non-volatile storage component, and the support routine may use the secured variable to authenticate a password received by the processing device to grant access to the data stored within the non-volatile storage component or to use the secured variable to decrypt the data stored within the non-volatile storage.

In Example 53, which includes the subject matter of any of Examples 41-52, the processing device may be caused to execute, in the pre-OS environment, an OS loader of the secure firmware to load at least a portion of the OS into the volatile storage and outside of the secure enclave in preparation for replacing the pre-OS operating environment with the OS operating environment.

In Example 54, which includes the subject matter of any of Examples 41-53, the processing device may be caused to execute, in the pre-OS environment, the secured firmware to attempt to authenticate the OS prior to loading of the at least a portion of the OS into the volatile storage.

In Example 55, at least one tangible machine-readable storage medium may include instructions that when executed by a processor component, cause the processor component to perform any of the above.

In Example 56, an apparatus may include means for performing any of the above.

The invention claimed is:

1. An apparatus to support secure processing comprising:
   a first processor component;
   a volatile storage coupled to the first processor component;
   an enclave component to, in a pre-operating system (pre-OS) operating environment, generate a secure enclave within a portion of the volatile storage to restrict access to a secured firmware loaded into the secure enclave;
   a first firmware driver to, in the pre-OS operating environment, provide a first application programming interface (API) to enable unsecured firmware to call a support routine of the secured firmware from outside the secure enclave; and
   a second firmware driver to, in an OS operating environment that replaces the pre-OS operating environment, provide a second API to enable an OS of the OS operating environment to call the support routine from outside the secure enclave.

2. The apparatus of claim 1, comprising a measuring component to, in the pre-OS operating environment, generate an initial measure of contents of the secure enclave after loading of the secured firmware into the secure enclave and prior to use of the support routine by the unsecured firmware via the first API.

3. The apparatus of claim 2, the measuring component to, in the pre-OS operating environment, generate another measure of the contents of the secure enclave and to compare the other measure to the initial measure in response to a call from the unsecured firmware to the support routine via the first API to authenticate the secured firmware.

4. The apparatus of claim 2, the measuring component to, in the OS operating environment, generate another measure of the contents of the secure enclave and to compare the other measure to the initial measure in response to a call from the OS to the support routine via the second API to authenticate the secured firmware.

5. The apparatus of claim 1, the support routine to access a secured variable stored within the secure enclave in response to at least one of a call to the support routine from the unsecured firmware via the first API in the pre-OS operating environment or a call to the support routine from the OS via the second API in the OS operating environment.

6. The apparatus of claim 1, the secured firmware comprising an OS loader to, in the pre-OS environment, load at least a portion of the OS into the volatile storage and outside of the secure enclave in preparation for replacing the pre-OS operating environment with the OS operating environment.

7. An apparatus to support secure processing comprising:
   a first processor component of a processing device;
   a volatile storage of the processing device;
   an enclave component to, in a pre-operating system (pre-OS) operating environment of the processing device, generate a secure enclave within a portion of the volatile storage to restrict access to a secured variable loaded into the secure enclave;
   a first firmware driver to, in the pre-OS operating environment, provide a first application programming interface (API) to enable unsecured firmware to call a support routine from outside the secure enclave to access the secured variable; and
   a second firmware driver to, in an OS operating environment that replaces the pre-OS operating environment, provide a second API to enable an OS of the OS operating environment to call the support routine to access the secured variable from outside the secure enclave.

8. The apparatus of claim 7, comprising:
   a non-volatile storage coupled of the processing device to store the secured variable prior to loading of the secured variable into the secure enclave;
   a verification routine to attempt to authenticate a secured firmware within the non-volatile storage prior to generation of the secure enclave to include at least the verification routine and the secured firmware within a chain of trust, the secured firmware comprising the enclave component; and
   a firmware loader incorporated into the secured firmware to load the secured variable and the secured firmware into the secure enclave after successful authentication of the secured firmware by the verification routine to extend the chain of trust to include the secure enclave.

9. The apparatus of claim 8, the first processor component comprising verification microcode to, in response to initialization of the processing device to start the pre-OS operating environment within the processing device, attempt to authenticate the verification routine prior to the verification routine attempting to authenticate the secured firmware to start the chain of trust with the verification microcode.

10. The apparatus of claim 9, the first processor component to, in response to a failure to authenticate the verification routine or the secured firmware, refrain from performing further initialization of the processing device, restart initialization of the processing device or operate a network interface of the processing device to transmit an indication of the failure to another device via a network.

11. The apparatus of claim 8, comprising a second processor component of the processing device, the second processor component comprising verification microcode to, in response to initialization of the processing device to start the pre-OS operating environment within the processing device, attempt to authenticate the verification routine prior to the verification routine attempting to authenticate the secured firmware to start the chain of trust with the verification microcode and the second processor component.

12. The apparatus of claim 11, the enclave component to cause the first processor component to trigger the second processor component to generate the secure enclave.

13. A computer-implemented method for supporting secure processing comprising:
- in a pre-operating system (pre-OS) operating environment, generating a secure enclave within a portion of volatile storage of a processing device;
- loading into the secure enclave, in the pre-OS operating environment, a secured firmware stored in a non-volatile storage of the processing device;
- loading into the volatile storage and outside of the secure enclave, in the pre-OS operating environment, a first firmware driver and a second firmware driver stored in the non-volatile storage;
- executing, in the pre-OS operating environment, the first firmware driver to provide a first application programming interface (API) to enable unsecured firmware to call a support routine of the secured firmware from outside the secure enclave in the pre-OS operating environment; and
- executing, in an OS operating environment that replaces the pre-OS operating environment, the second firmware driver to provide a second API to enable an OS of the OS operating environment to call the support routine from outside the secure enclave in the OS operating environment.

14. The computer-implemented method of claim 13, comprising:
- executing, by a first processor component the processing device, a verification routine to attempt to authenticate the secured firmware within the non-volatile storage prior to generation of the secure enclave to include at least the verification routine and the secured firmware within a chain of trust; and
- executing, by the first processor component, the secured firmware to generate the secure enclave and to load the secured firmware into the secure enclave after successful authentication of the secured firmware by the verification routine to extend the chain of trust to include the secure enclave.

15. The computer-implemented method of claim 14, comprising, in response to initialization of the processing device to start the pre-OS operating environment within the processing device, executing verification microcode incorporated into the first processor component to attempt to authenticate the verification routine prior to the verification routine attempting to authenticate the secured firmware to start the chain of trust with the verification microcode.

16. The computer-implemented method of claim 14, comprising generating an initial measure of contents of the secure enclave in the pre-OS operating environment after loading of the secured firmware into the secure enclave and prior to use of the support routine by the unsecured firmware via the first API.

17. The computer-implemented method of claim 16, comprising generating another measure of the contents of the secure enclave and comparing the other measure to the initial measure in the pre-OS operating environment in response to a call from the unsecured firmware to the support routine via the first API to authenticate the secured firmware.

18. The computer implemented method of claim 16, comprising generating another measure of the contents of the secure enclave and comparing the other measure to the initial measure in the OS operating environment in response to a call from the OS to the support routine via the second API to authenticate the secured firmware.

19. At least one tangible machine-readable storage medium comprising instructions that when executed by a processing device, cause the processing device to:
- in a pre-operating system (pre-OS) operating environment, generate a secure enclave within a portion of volatile storage;
- load into the secure enclave, in the pre-OS operating environment, a secured firmware stored in a non-volatile storage;
- load into the volatile storage and outside of the secure enclave, in the pre-OS operating environment, a first firmware driver and a second firmware driver stored in the non-volatile storage;
- execute, in the pre-OS operating environment, the first firmware driver to provide a first application programming interface (API) to enable unsecured firmware to call a support routine of the secured firmware from outside the secure enclave in the pre-OS operating environment; and
- executing, in an OS operating environment that replaces the pre-OS operating environment, the second firmware driver to provide a second API to enable an OS of the OS operating environment to call the support routine from outside the secure enclave in the OS operating environment.

20. The at least one tangible machine-readable storage medium of claim 19, the processing device caused to generate an initial measure of contents of the secure enclave in the pre-OS operating environment after loading of the secured firmware into the secure enclave and prior to use of the support routine by the unsecured firmware via the first API.

21. The at least one tangible machine-readable storage medium of claim 20, the processing device caused to generate another measure of the contents of the secure enclave and compare the other measure to the initial measure in the pre-OS operating environment in response to a call from the unsecured firmware to the support routine via the first API to authenticate the secured firmware.

22. The at least one tangible machine-readable storage medium of claim 20, the processing device caused to generate another measure of the contents of the secure enclave and compare the other measure to the initial measure in the OS operating environment in response to a call from the OS to the support routine via the second API to authenticate the secured firmware.

23. The at least one tangible machine-readable storage medium of claim 19, the processing device caused to execute the support routine to access a secured variable stored within the secure enclave in response to at least one of a call to the support routine from the unsecured firmware via the first API in the pre-OS operating environment or a call to the support routine from the OS via the second API in the OS operating environment.

24. The at least one tangible machine-readable storage medium of claim 23, the processing device comprising a network interface to couple the processing device to a network, the secured variable comprising a security credential to support data encryption in communications through the network interface, and the support routine to use the secured variable to encrypt data transmitted to another device via the network or to decrypt data received from another device at the network interface.

25. The at least one tangible machine-readable storage medium of claim 23, the processing device comprising a non-volatile storage component, the secured variable comprising a security credential to support accessing data stored within the non-volatile storage component, and the support routine to use the secured variable to authenticate a password received by the processing device to grant access to the data stored within the non-volatile storage component or to use the secured variable to decrypt the data stored within the non-volatile storage.

* * * * *